(12) United States Patent
Louch et al.

(10) Patent No.: US 10,579,204 B2
(45) Date of Patent: *Mar. 3, 2020

(54) USER INTERFACE FOR MULTIPLE DISPLAY REGIONS

(71) Applicant: Apple Inc., Cupertino, CA (US)

(72) Inventors: John O. Louch, San Luis Obispo, CA (US); Timothy W. Bumgarner, Sharpsburg, MD (US); Eric S. Peyton, Lisle, IL (US); Christopher J. Hynes, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/635,585

(22) Filed: Jun. 28, 2017

(65) Prior Publication Data

US 2017/0300180 A1 Oct. 19, 2017

Related U.S. Application Data

(63) Continuation of application No. 14/962,386, filed on Dec. 8, 2015, now Pat. No. 9,720,584, which is a
(Continued)

(51) Int. Cl.
*G06F 3/0481* (2013.01)
*G06F 9/451* (2018.01)
(Continued)

(52) U.S. Cl.
CPC .......... *G06F 3/0481* (2013.01); *G06F 3/0482* (2013.01); *G06F 3/0486* (2013.01);
(Continued)

(58) Field of Classification Search
CPC .. G06F 3/0481; G06F 3/04845; G06F 3/0482; G06F 3/0486; G09G 5/14
See application file for complete search history.

(56) References Cited

U.S. PATENT DOCUMENTS

| 4,769,636 A | 9/1988 | Iwami et al. |
| 4,888,690 A | 12/1989 | Huber |

(Continued)

FOREIGN PATENT DOCUMENTS

| AU | 2010259089 B2 | 2/2014 |
| CN | 86105001 A | 4/1987 |

(Continued)

OTHER PUBLICATIONS

Office Action for corresponding Chinese Application No. 201610030996.X dated May 23, 2018.
(Continued)

*Primary Examiner* — Phenuel S Salomon
(74) *Attorney, Agent, or Firm* — Fernando & Partners, LLP

(57) ABSTRACT

User interfaces for multiple display regions are described. One embodiment provides an array of non-overlapping windows that are created from a set of overlapping windows, and a user can select one of the non-overlapping windows to obtain an enlarged view of that selected window while keeping the other windows in their non-overlapping state. In one embodiment, the array of non-overlapping windows can include minimized windows or windows in other virtual desktops (e.g. windows in other "Spaces") or both. In one embodiment, only windows of a selected application are shown in non-overlapping mode while opened windows of other applications are not shown.

20 Claims, 27 Drawing Sheets

Related U.S. Application Data continuation of application No. 14/738,124, filed on Jun. 12, 2015, now Pat. No. 9,223,465, which is a continuation of application No. 14/141,095, filed on Dec. 26, 2013, now Pat. No. 9,081,474, which is a continuation of application No. 12/549,338, filed on Aug. 27, 2009, now Pat. No. 8,621,387.

(60) Provisional application No. 61/268,186, filed on Jun. 8, 2009.

(51) Int. Cl.
| | | |
|---|---|---|
| G06F 3/0486 | (2013.01) | |
| G09G 5/14 | (2006.01) | |
| G06F 3/0482 | (2013.01) | |
| G06F 3/0484 | (2013.01) | |
| H04L 29/08 | (2006.01) | |

(52) U.S. Cl.
CPC ...... *G06F 3/04812* (2013.01); *G06F 3/04817* (2013.01); *G06F 3/04842* (2013.01); *G06F 3/04845* (2013.01); *G06F 3/04847* (2013.01); *G06F 9/451* (2018.02); *G09G 5/14* (2013.01); *H04L 67/10* (2013.01); *G06F 2203/04803* (2013.01)

(56) References Cited

U.S. PATENT DOCUMENTS

| | | | |
|---|---|---|---|
| 5,371,847 A | 12/1994 | Hargrove | |
| 5,390,295 A | 2/1995 | Bates et al. | |
| 5,459,825 A | 10/1995 | Anderson et al. | |
| 5,487,143 A | 1/1996 | Southgate | |
| 5,497,454 A | 3/1996 | Bates et al. | |
| 5,546,520 A | 8/1996 | Cline et al. | |
| 5,561,757 A | 10/1996 | Southgate | |
| 5,564,002 A * | 10/1996 | Brown | G09G 5/14 715/778 |
| 5,712,995 A | 1/1998 | Cohn | |
| 5,771,042 A | 6/1998 | Santos-Gomez | |
| 5,796,402 A | 8/1998 | Ellison-Taylor | |
| 5,880,725 A | 3/1999 | Southgate | |
| 6,008,809 A | 12/1999 | Brooks | |
| 6,075,531 A | 6/2000 | Destefano | |
| 6,326,935 B1 | 12/2001 | Boger | |
| 6,342,908 B1 | 1/2002 | Bates et al. | |
| 6,385,639 B1 | 5/2002 | Togawa | |
| 6,388,685 B1 | 5/2002 | Minoura et al. | |
| 6,750,858 B1 * | 6/2004 | Rosenstein | G09G 5/14 715/790 |
| 6,915,490 B1 * | 7/2005 | Ewing | G06F 3/0486 715/767 |
| 6,957,395 B1 * | 10/2005 | Jobs | G06F 3/0481 715/700 |
| 6,966,033 B1 * | 11/2005 | Gasser | H04L 41/22 715/738 |
| 6,970,749 B1 | 11/2005 | Chinn et al. | |
| 7,146,573 B2 | 12/2006 | Brown et al. | |
| 7,353,458 B2 * | 4/2008 | Malmstrom | G09G 5/00 715/788 |
| 7,533,349 B2 * | 5/2009 | Saul | G06F 3/0486 709/202 |
| 7,581,192 B2 | 8/2009 | Stabb et al. | |
| 8,453,067 B1 | 5/2013 | Holler et al. | |
| 8,555,185 B2 | 10/2013 | Louch et al. | |
| 8,612,883 B2 | 12/2013 | Louch et al. | |
| 8,621,387 B2 | 12/2013 | Louch et al. | |
| 9,081,474 B2 | 7/2015 | Louch et al. | |
| 9,223,465 B2 | 12/2015 | Louch et al. | |
| 2003/0179240 A1 * | 9/2003 | Gest | G06F 3/0481 715/779 |
| 2004/0261037 A1 | 12/2004 | Ording et al. | |
| 2004/0261038 A1 | 12/2004 | Ording et al. | |
| 2004/0261039 A1 * | 12/2004 | Pagan | G06F 3/0481 715/797 |
| 2005/0223334 A1 | 10/2005 | Guido et al. | |
| 2006/0041846 A1 | 2/2006 | Masselle et al. | |
| 2006/0085760 A1 * | 4/2006 | Anderson | G06F 3/0481 715/778 |
| 2006/0218504 A1 | 9/2006 | Hiroi et al. | |
| 2006/0245237 A1 * | 11/2006 | Nguyen | G06F 9/445 365/145 |
| 2006/0248404 A1 * | 11/2006 | Lindsay | G06F 3/0481 714/38.14 |
| 2007/0005795 A1 | 1/2007 | Gonzalez | |
| 2007/0022389 A1 | 1/2007 | Ording et al. | |
| 2007/0044039 A1 * | 2/2007 | Amadio | G06F 9/451 715/847 |
| 2007/0050724 A1 | 3/2007 | Lee et al. | |
| 2007/0192733 A1 | 8/2007 | Horiuchi | |
| 2007/0288863 A1 * | 12/2007 | Ording | G06F 3/0481 715/788 |
| 2008/0018666 A1 | 1/2008 | Takeuchi | |
| 2008/0034317 A1 * | 2/2008 | Fard | G06F 3/0481 715/781 |
| 2008/0034318 A1 | 2/2008 | Louch et al. | |
| 2008/0163104 A1 * | 7/2008 | Haug | G06F 3/0481 715/788 |
| 2008/0229232 A1 | 9/2008 | Schulz et al. | |
| 2009/0100462 A1 | 4/2009 | Park | |
| 2009/0187857 A1 | 7/2009 | Tanaka | |
| 2010/0134633 A1 | 6/2010 | Engeli et al. | |
| 2010/0313164 A1 | 12/2010 | Louch et al. | |
| 2015/0277670 A1 | 10/2015 | Louch et al. | |

FOREIGN PATENT DOCUMENTS

| | | |
|---|---|---|
| CN | 1784647 A | 6/2006 |
| CN | 1826575 A | 8/2006 |
| CN | 101379462 A | 3/2009 |
| CN | 101438593 A | 5/2009 |
| EP | 1491990 A2 | 12/2004 |
| EP | 1847924 A1 | 10/2007 |
| WO | 2008058042 A1 | 5/2008 |

OTHER PUBLICATIONS

Office Action for Korean Appl. No. 10-2015-7035703 dated Mar. 22, 2016, 11 pgs.
First Examiner Report for Australian Appl. No. 2010259089 dated Dec. 21, 2012, 3 pgs.
Second Examiner Report for Australian Appl. No. 2010259089 dated May 29, 2013, 3 pgs.
Office Action for Chinese Appl. No. 201080031518.1 dated Mar. 24, 2014, 12 pgs.
Office Action for Chinese Appl. No. 201080031518.1 dated Jun. 5, 2013, 15 pgs.
Office Action for Chinese Appl. No. 201080031518.1 dated Jun. 10, 2015, 6 pgs.
Office Action for Chinese Appl. No. 201080031518.1 dated Sep. 28, 2014, 17 pgs.
Examination Notification for EP Appl. No. 10725334.6 dated Mar. 11, 2015, 7 pgs.
European Communication for EP Appl. No. 10725334.6 dated Jan. 23, 2012, 2 pgs.
International Preliminary Report on Patentability for PCT/US2010/037525 dated Dec. 12, 2011, 6 pgs.
International Search Report and Written Opinion for PCT/US2010/037525 dated Jan. 24, 2011, 6 pgs.
Notice of Preliminary Rejection for Korean Appl. No. 10-2012-7000504 dated May 28, 2013, 9 pgs.
Mcqwark et al., "Taskbar Ruminations", retrieved from the internet: http://www.kde-forum.orq/artikel/24310/task-bar-ruminations.html. Nov. 18, 2008, 4 pgs.
Miser, "Managing Your Desktop with Expose, Spaces, and Other Tools", Using MacOS X Leopard, Special Edition, Chapter 12 Copyright 2008 by Que Publishing, Jan. 2008, pp. 266-269.

(56) References Cited

OTHER PUBLICATIONS

Robertson et al., "Scalable Fabric: Flexible Task Management", May 2004, pp. 85-89.
Cohen et al., "Automatic strategies in the Siemens RTL tiled window manager" Proceedings of the 2nd IEEE conference on Computer Workstations (1998), 3 pgs.
McFredries et al., "Windows 98 Unleashed" Sams Publishing, May 1998, Cover page.
Office Action for corresponding Chinese Application No. 201610030996.X dated Jan. 30, 2019.

* cited by examiner

USER INTERFACE FOR MULTIPLE DISPLAY REGIONS

CROSS-REFERENCE TO RELATED APPLICATIONS

This application is a continuation of U.S. patent application Ser. No. 14/962,386, filed on Dec. 8, 2015, and issued as U.S. Pat. No. 9,720,584, which is a continuation of U.S. patent application Ser. No. 14/738,124, filed on Jun. 12, 2015, and issued as U.S. Pat. No. 9,223,465, which is a continuation of U.S. patent application Ser. No. 14/141,095, filed on Dec. 26, 2013, and issued as U.S. Pat. No. 9,081,474, which is a continuation of U.S. patent application Ser. No. 12/549,338, filed on Aug. 27, 2009, and issued as U.S. Pat. No. 8,621,387, which claims priority to U.S. Provisional Patent App. No. 61/268,186, filed on Jun. 8, 2009, which are all hereby incorporated by reference in their entirety.

BACKGROUND

Data processing systems, such as general purpose computers, often employ a graphical user interface which allows for the simultaneous presentation of multiple windows which can at least partially overlap each other on the screen of a display device. FIG. 1A shows an example of a graphical user interface on a screen of a display device; there are multiple overlapping windows, often presented by multiple applications, which are running concurrently on the data processing system. While the ability to have multiple windows open concurrently can provide a rich operating environment, thereby allowing a user to view and operate on windows from multiple applications, it can also create confusion and clutter in the graphical user interface.

SUMMARY OF THE DESCRIPTION

One embodiment of the present invention provides an improved version of Exposé, which is a feature of the Macintosh operating system that allows a user to spread out windows created from a collection of windows which may overlap each other. It will be understood that a window is a display region; in one embodiment, the display region has a defined border or perimeter and can be moved independently of other display regions on a desktop region and can be minimized. Exposé provides a live preview of the contents of each window in the array. In one embodiment, the array can be spread out in a gridlike manner on the screen of a display device. In one embodiment, a grid algorithm may be employed which maximizes window size of the various windows displayed in the array while keeping the windows on a grid; this algorithm may also attempt to minimize window movement from the current location of each window.

In one embodiment, this improved version of Exposé provides an enlarged preview of any one of the windows in the array of windows provided by Exposé. The user can select any one of the windows by, for example, hovering a cursor over the window in the array and then pressing a key, in one embodiment, in order to cause this improved version of Exposé to display an enlarged preview, which is larger than the version of the window shown in Exposé if the window was reduced in size in order to fit within the grid or array provided by this improved version of Exposé. In one embodiment, Exposé attempts to show the window in its original size.

In one embodiment, this improved version of Exposé can display minimized windows in, for example, a minimized window section of the array. In an alternative embodiment, the minimized windows are displayed in the array without a minimized window section. In one embodiment, if Exposé provides a minimized window section, a user can dynamically change the size of that section and thereby resize the minimized windows. In one embodiment, the moveable separator can be moved by user interaction (e.g. selection of a separator line and dragging of the line or otherwise moving of the line up or down (or left and right in an alternative embodiment)) in order to resize the two sections and thereby resize the windows within the two sections.

In certain embodiments of the present invention, a name for each window is displayed adjacent to each window in Exposé, whether or not the window is currently selected in Exposé. Further, highlighting around the window or other indicator of a selection can be provided in the user interface to show the user which window in Exposé is currently selected. In one embodiment, the icon in the dock for the application displaying the currently selected window can also be highlighted in the dock. In one embodiment of Exposé described herein, the dock remains active and can accept user input while Exposé displays the windows in the array or grid described herein. For example, the user may move a cursor or otherwise select icons along the dock while in Exposé mode to bring up one or more menus for each icon for an application on the dock. In one embodiment, the user can select an icon on the dock while in the Exposé mode to show only those windows (including minimized windows) of that application; in one embodiment, this method can work even for hidden windows when the user has previously selected the "hide" command from an application menu for the application. In one embodiment, a user can invoke Exposé by selecting an application's icon on the dock and by holding the selection (e.g. "click" on the icon and hold down the mouse's button or tap and hold with a finger or stylus), and this results in the display of all currently open windows and minimized windows for the application even if the application was previously hidden by the user. In one embodiment, the selection can occur by positioning a cursor over the icon on the dock and pressing a key or button (e.g. a mouse's button) and holding the button down for a period of time in order to cause Exposé to be invoked for that application, thereby hiding all other windows for other applications and displaying in Exposé only those windows of the application selected from the interaction with the dock.

At least certain embodiments of the present invention provide support for dragging and dropping of a file or other item (e.g. content within a file) onto an application's icon in the dock in order to invoke Exposé, to thereby cause the display of all of the windows of that application currently open (and minimized windows) in order to allow the user to continue the drag to deposit the file or other item into a window selected from the array of windows in Exposé for that application. For example, a plurality of windows from a plurality of applications may be displayed concurrently on the display device and the user may select a file from the desktop or a file from a user interface window of a file management system, such as the Finder, and then drag that selected file or otherwise move that selected file to an icon on the dock for a particular application, thereby causing all windows for other applications to be removed from the display and to cause Exposé to present all windows for that application selected by the dragging operation to be displayed in the Exposé mode. It will be understood that the drag and drop operation can occur by selecting the file or other item and then by selecting a command to indicate the file or other item to be associated with an icon or other representation of the application which can be selected by the user in a further operation.

Other features and embodiments are described further below. It will be understood that the present invention may be implemented in a variety of data processing systems, such as general purpose computers, handheld computers, embedded systems, cellular telephones, and other consumer electronic devices. It will also be understood that the present invention may be implemented in software which is stored on a computer readable medium which will cause a data processing system to perform one or more of the methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2009.

The present invention will be described relative to the Macintosh Operating System (OS) X and in particular to the feature known as Exposé in that operating system. It will be understood that one or more embodiments described herein may also be employed in other operating systems or in other software products, such as the Windows operating system or a mobile device operating system (e.g. an operating system for a smart phone or other cellular telephone). It will also be understood that the term "Exposé," while referring to a particular feature of the Macintosh operating system, also refers to similar features which can be provided on other systems and which can provide an array of spread out windows (also referred to as display regions) created from a collection of at least partially overlapping windows, wherein the windows in the array show the content of the window, particularly in a reduced form, such as a thumbnail of the content of the window. The content which is viewable in the window in its "normal" (non-Exposé) mode is also viewable in its Exposé mode in one embodiment. Further, the content could be live in the sense that if the content of the window is changing (e.g. a movie which is running in the window) then the content of the window in Exposé is also updated in a live fashion. The windows when spread out can be spaced apart so they do not touch each other or they can be tiled so they do. It will also be understood that the term "dock" refers to the dock in Macintosh OS X but it also refers to other control regions on the display such as a task bar or other region which allows a user to select applications or move between launched applications (in order to, for example, switch the front most window from a first application's window to a second application's window or set of windows) or launch an application or place an icon on the region so it can be used in the future.

Figure 1A:
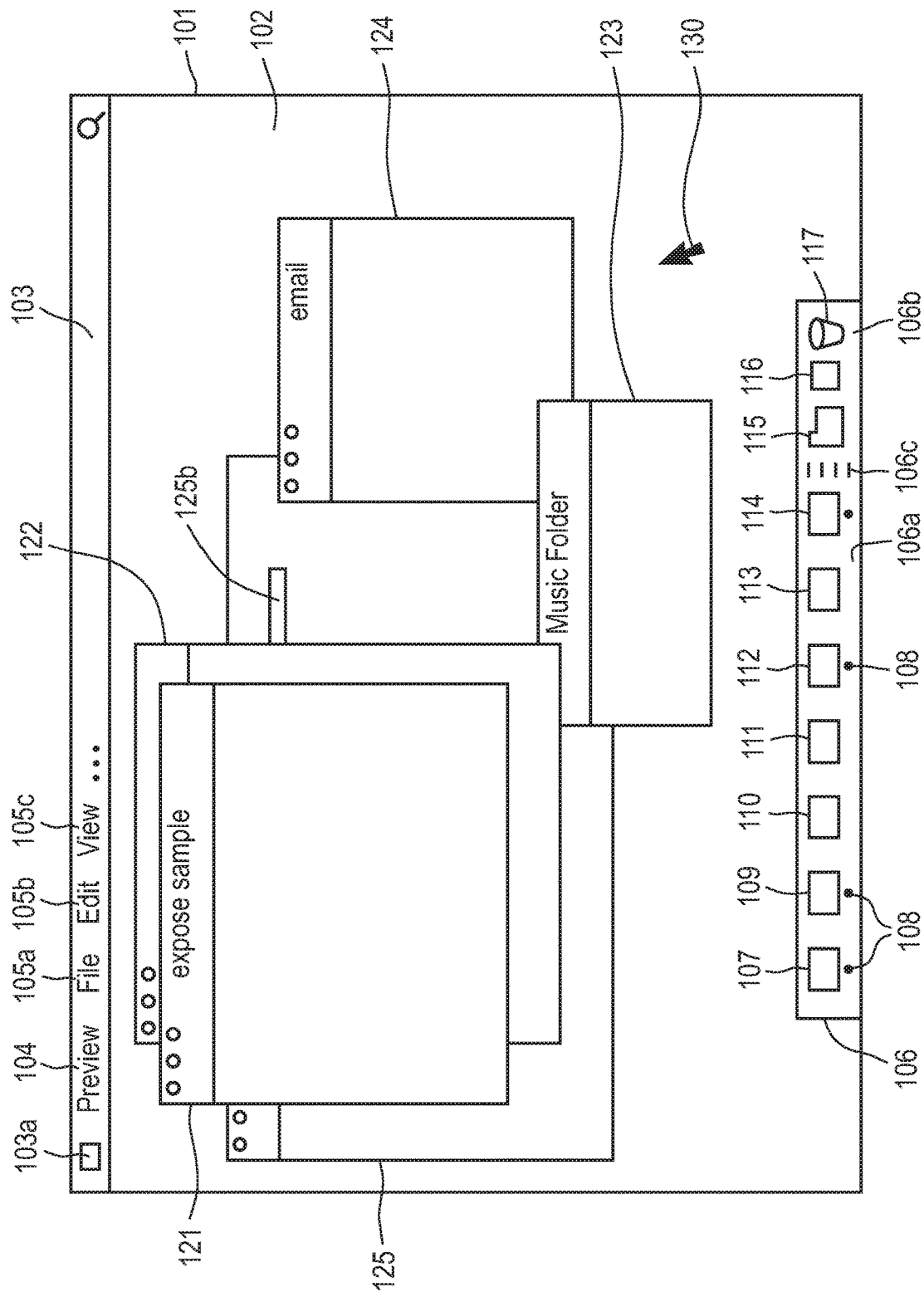
FIG. 1A shows an example of a user interface showing a plurality of windows for a plurality of applications currently executing on a data processing system.

FIG. 1A shows an example of a graphical user interface which appears on a screen of a display device 101. The user interface includes a desktop region on which is displayed a dock 106, a menu bar 103, and a plurality of opened windows generated by, in this case, four executing user applications as shown by the indicators 108 in the dock 106. The menu bar 103 includes a system menu icon 103A which may be selected to thereby cause the display of a system menu. An application menu 104 for a particular frontmost application (in this case Preview) is shown as the application menu 104. The selection of that menu item causes the display of a menu for that application. The menu selectors 105A, 105B, 105C, etc. are conventional menu selectors for the frontmost application which in this case is the application Preview. The Preview application is currently displaying two windows. Preview window 121 and Preview window 122. In addition, three other applications, the Finder application represented by icon 107 in dock 106, a Web browser application represented by icon 109 in the dock 106, and an email application represented by the icon 114 in the dock 106 are also currently executing and are causing the display of one or more windows on the desktop 102. While the Preview application is causing the display of windows 121 and 122, the Finder application, represented by icon 107, is causing the display of the music folder window 123 and the email application is causing the display of the email window 124, and the Web browser application is causing the display of a Web browser window 125 which includes a URL entry field 125B. The system also includes a representation of a minimized window 116 shown in the dock portion 106B. The icon for the minimized window 116 represents the content of that minimized window which, in this case, is another window controlled by the email program represented by icon 114. Icon 112 represents the preview application. As is known in the art, the dock 106 is a region which allows a user to place icons for applications in the portion 106A, and the user can place folders and other items in the dock portion 106B as is known in the art. The dock can be used to launch an application, quit an application, force quit an application, or to bring frontmost a window or all windows of an application. The desktop 102 may include one or more icons of files or other items which the user has placed or the system has placed on the desktop. In addition, a cursor 130 can be used by a user to interact with the system. The cursor may be controlled by a mouse or a touchpad or a trackball or other known input devices. As is known in the art, the cursor can be moved around the display to select windows, position text for entry, cause the display of menus from the menu bar 103 or to interact with the dock 106. In other embodiments, speech recognition may be employed to allow voice control of the user interface to select windows, interact with the dock, cause the display of menus from the menu bar, etc. In other embodiments, a touchpad or other touch sensitive surface such as a display screen with an integrated transparent touch panel to receive touch (e.g. stylus or finger touch) input can be used to receive user inputs to interact with one or more embodiments described herein.

Figure 1B:
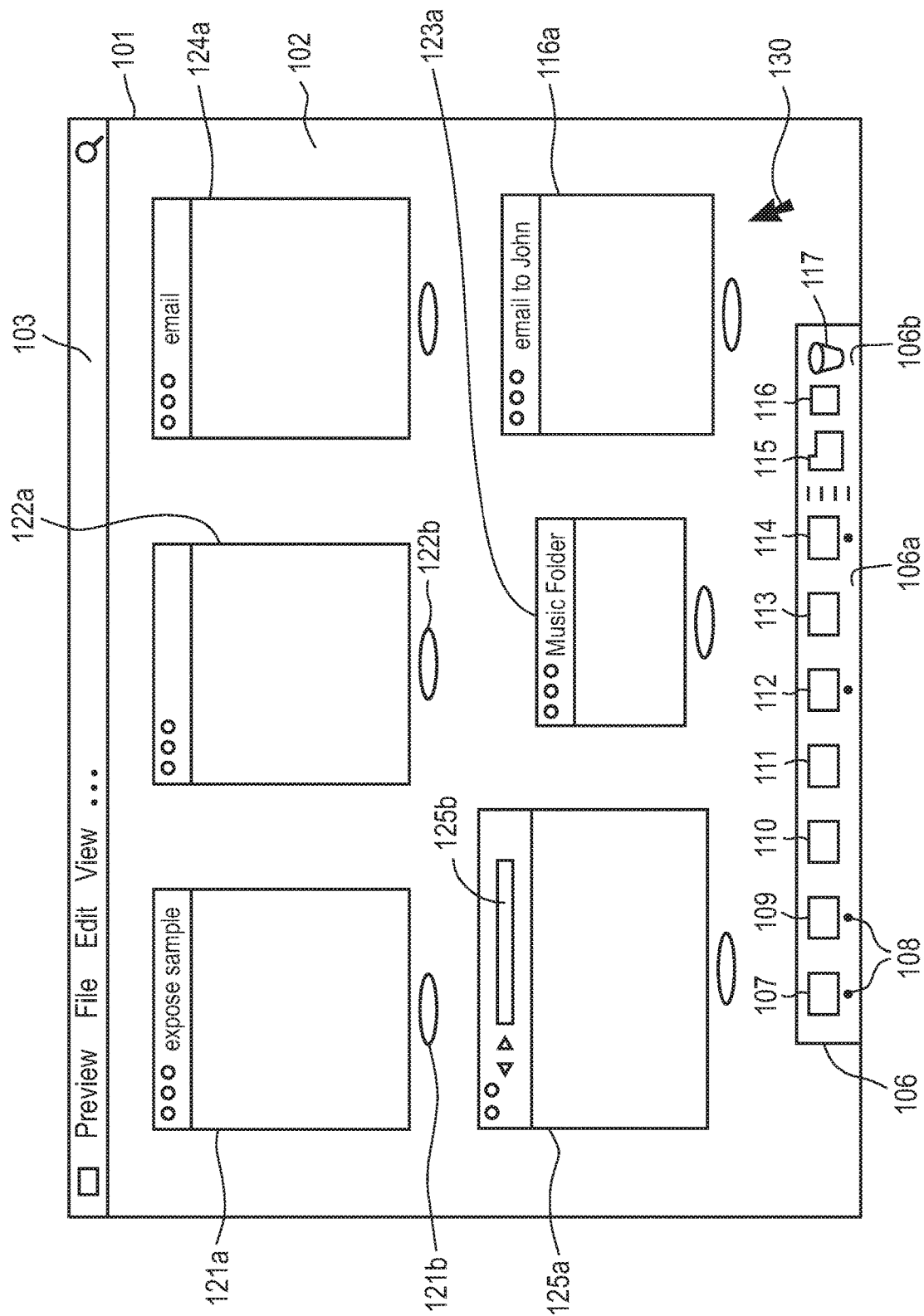
FIG. 1B shows an example of a user interface according to one embodiment of the present invention in which the plurality of windows are spread out in an array to show all of the windows concurrently in a non-overlapping manner. This array may be referred to as Exposé mode.
Figure 1C:
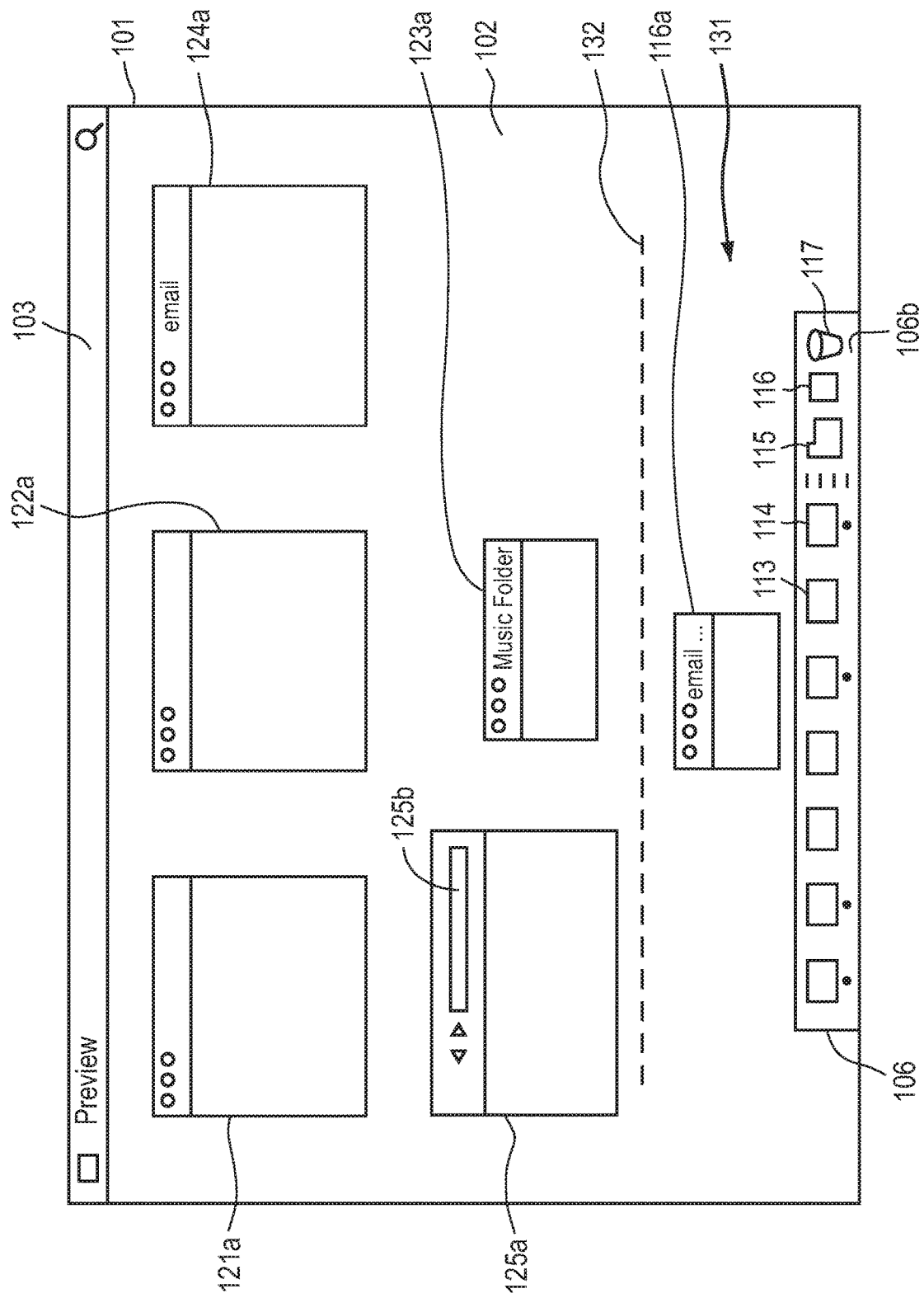
FIG. 1C shows another embodiment of the present invention in which one section of the array shows windows of applications which have not been minimized and another section of the array shows windows which have been minimized.

FIG. 1B shows an embodiment of the present invention in which windows are displayed in the Exposé mode, and in this mode even minimized windows are displayed. In prior versions of Exposé, minimized windows were not displayed in the Exposé mode; rather, an icon for each minimized window would appear in the dock portion 106B such as the icon 116 which represents the minimized window 116A of FIG. 18B. Another embodiment in which an Exposé mode displays minimized windows is shown in FIG. 1C. In this embodiment, a minimized section 131 displays the minimized window in its own section, separately from the non-minimized windows. A separator bar 132 shows a separation between the minimized section 131 and the non-minimized section which shows the non-minimized windows above the separator line 132 as shown in FIG. 1C. Referring back to FIG. 1B, it can be seen that the windows are laid out in Exposé mode in an array or grid. The array spreads out the overlapping windows to allow the user to see all the windows in one mode or to allow the user to see all the windows of a selected application in another Exposé mode. In certain embodiments of Exposé mode, the array is spread out so that no windows are overlapping, although they may be tiled so that the edges of adjacent windows "touch" each other. The window 121A represents the window 121 and shows the contents of the window 121 in the Exposé mode shown in FIG. 1B. Similarly, the window 122A shows the contents of the preview window 122, and the email window 124A shows in Exposé mode the contents of the email window 124. Further, the Web browser window 125A shows in Exposé mode the contents of the window 125, and the Finder window 123A shows in Exposé mode the contents of the Finder window 123 from FIG. 1A. The minimized window 116A shows the contents in Exposé mode of the minimized window which is also represented by the icon 116 in the dock portion 106B. In one embodiment, each window is identified by a window name, such as the window names 121B and 122B shown below its corresponding window. In one embodiment, these names or labels are displayed all of the time in Exposé mode in order for the user to see the title or name of the window at all times. In the prior version of Exposé, the name only appeared when the user positioned the cursor, such as the cursor 130, over the particular window in the Exposé mode.

In one embodiment, as the user moves a cursor 130 over any one of the windows, the window may highlight or have a highlighting shown around the window or some other indicia which appears to indicate that the window is currently selected in Exposé mode. In addition, in one embodiment, as the user positions the cursor over any one of the windows in the Exposé mode or along icons in the dock, highlighting appears to indicate the selected application icon in the dock and its corresponding application windows in Exposé mode which can also be highlighted concurrently while highlighting the icon in the dock. Entry into Exposé mode (e.g. through a key press) and exit from Exposé mode (e.g. through another key press) can be done without changing the frontmost application and can be used as a way to peek at other windows without actually selecting or managing them and without a focus change. Similarly, entry into Exposé mode and exit from Exposé mode through a user interaction with the dock (e.g. click and hold on a dock icon as in the case of the embodiment of FIGS. 3A-3D) also can be done without changing the frontmost application and hence can be used as a way to peek at other windows without actually selecting or managing them and without a focus change.

While in Exposé mode, as shown in FIG. 1B, the user may select any one of the windows 121A, 122A, 124A, 125A, 123A, and 116A. This selection may occur, while in Exposé mode, by positioning ("hovering") the cursor 130 over the window or by using the arrow keys on a keyboard or other mechanism or by touching one of the windows with a touchpad or by typing the name of the window or other techniques known in the art. The selection within Exposé mode can then be used to invoke an enhanced preview of the window to show a larger or enhanced version of the selected window if it is available. In some cases, with many windows open at once, a window in Exposé mode may be too small to see the contents of the window while in Exposé mode, and this method allows a user to select a particular window while in Exposé mode and then to provide a command (e.g. pressing the space bar) which causes the display of the enhanced preview or enlarged window in Exposé mode. This is further shown in connection with FIGS. 2A, 2B, and 2C.

In one embodiment, the preview or enlarged view of a selected window while in Exposé mode can be invoked in a variety of ways using, for example, the space bar. The window can be selected as described herein (for example, it can be selected by hovering a cursor over the window in Exposé mode); once selected while in Exposé mode, rapidly pressing and releasing the space bar locks the system in preview mode (in which the selected window will be displayed in its enlarged version) until the user exits from Exposé mode using an exit command (e.g. positioning the cursor over a region of the desktop and pressing a mouse's button or by pressing and releasing a key such as the F9 key) or until the user unlocks preview mode by pressing the space bar again. Another way to invoke the preview or enlarged window within Exposé mode is to invoke Exposé mode using one of the techniques described herein (e.g. press and release the F9 key) and then press and hold the space bar and then move the cursor over any window to select it; as long as the space bar is held down while in Exposé mode, any selected window will be presented in its enlarged version (which can and often will overlap other windows that are not overlapping each other in Exposé mode).

While the windows are arranged in Exposé mode in an array, such as the array shown in FIG. 1B, the user can sort the windows in one embodiment. For example, the user can sort by application which will group all windows controlled by a particular application together in the array. The user can also sort by name (e.g. an alphabetical sorting by name of window). In one embodiment, the user can select, while the windows are displayed in the array in Exposé mode, a window by typing the name of the window or by typing a portion of the name. In one embodiment, searching of the windows in Exposé mode can be performed in response to a user input of a search term or query. The searching can be for the name or title of the window or contents while in Exposé mode; in one embodiment, the system receives the search term or query and determines whether any windows in Exposé mode match the search term or query. For example, a search query of "email" in the case of the example shown in FIG. 1B will yield 2 hits or matches; in one embodiment, Exposé mode can be configured to show, within Exposé mode, only those windows that match the search query (and hence the other windows are no longer shown in Exposé mode until the search query is cleared). The searching can be limited to open windows and optionally minimized windows and hidden windows and their content and metadata.

In one embodiment, a particular grid algorithm may be used to cause the display of the windows in an array or grid. An example of such a grid algorithm is provided here.

grid algorithm:
inputs:
a) list of windows
b) rectangle to fit those windows step 1: find best guess number of rows and cols
divide the fit rectangle (rect) (b) into n cells. Where n is the number of windows (a). Cells are rectangles.
number of columns=square root of number of windows
number of rows=number of windows divided by number of columns (cols)
cell width=fit rect width divided by number of columns
cell height=fit rect height divided by number of rows
step 2: decrease # of rows if the total compressed window area is greater than the previous # of rows (note this can be done in a binary fashion, instead of decreasing one row at a time.)
calculate the total area of windows that fit in the rows/cols described in step 1
calculate the total area of windows that fit in the (rows−1)/cols in step 1
if the total area of compressed windows of rows−1, change # of rows to be rows −1, and adjust cols to hold all the windows
repeat step 2
step 3: if you start with 1 row, see if one column will better fit than 1 row same math as step 2, just setting # of columns to 1.
(note that in step 2 you could try to decrease both rows and cols by 1, to find the maximized size windows, though row layout is preferred in one embodiment for a more "natural" human readable feel)
step 4: sort windows by their top position (y value)
(note you could sort by x here as well for more of a column layout, see notes above)
sort windows first by their y, values
if equal sort by their center y values (top+bottom/2)
if still equal use their window-z order to always have a stable sort
step 5: layout 1 row at a time, sorting by their x value
sort windows of row by left value (x)
if equal sort by their center x
if equal sort by their z-order
layout windows with or without title in the row, optionally center entire row if # of items in row does not equal columns.

This will create a grid of windows, where the windows are both at a maximized size on a grid or array as well as closest as possible to their original location to minimize movement during the Exposé animation. In alternative embodiments, a list view or freeform view, which can be organized in groups by application, can be provided in Exposé mode.

Also note that the system can consider the space between windows of each row, and if that space is larger than some constraint limit it to that constraint. The constraint could be applied across all rows or not, depending on desired look.

Since this is a grid, windows will not be uniformly scaled in most embodiments. Each will have a different scale factor based on the grid cell width/height. In one embodiment, if there are many windows that got scaled and one or more that have not, the system can apply some amount of scaling to the windows that have not so that the unscaled windows do not stand out more than the scaled ones.

FIG. 1C shows an example of a display of an array containing windows in Exposé mode with a minimized section in Exposé. The minimized section 131 in this embodiment is shown in the lower portion of the desktop 102, and that section 131 is separated from the non-minimized section by the separator 132. In one embodiment, the separator 132 is moveable by the user to change the size of the minimized section 131. If the separator 132 is moved upwardly, then the minimized section 131 enlarges, which can cause the minimized windows within the minimized section to also be enlarged while at the same time reducing the size of the non-minimized section and also reducing the size of the one or more windows in the non-minimized section of the array. Moving the separator 132 downwardly will decrease the size of the minimized section 131 and can cause a reduction in the size of the minimized windows while expanding the size of the non-minimized windows in the non-minimized section during the Exposé mode. In one embodiment, the position of the separator 132, after adjustment by a user, can be stored by the system and then used as a persistent setting across invocations of Exposé mode. The embodiment shown in FIG. 1C shows that the minimized window has an icon 116 shown in the dock portion 106B. In this embodiment, for each window which has been minimized, there will be an icon representing that minimized window in the dock portion 106B. In another embodiment, the user can set the system, through a user preference setting, so that no such icon appears in the dock portion 106B, but rather the application, in effect, minimizes into the icon for the application on the dock in the dock portion 106A. For this alternative embodiment, rather than displaying the icon 116, the email icon 114 will present, through a menu structure, the name of the minimized window when the user activates the menu in association with the icon 114. In one embodiment, the email icon 114 can show an indicator (e.g. a number) that minimized windows have been minimized to this icon on the dock, and in this embodiment, the display of an icon in the dock portion 106b for the minimized window is optional. A minimized window is a window that has been removed from a desktop or main display region; the application that controls the window is normally still executing, and a miniature representation of the window can be displayed (e.g., it can be displayed in a dock or task bar). An application can display several windows concurrently and each of those can be separately and independently minimized through conventional user interface techniques such as selection of a minimize button or region on a window.

Figure 1D:
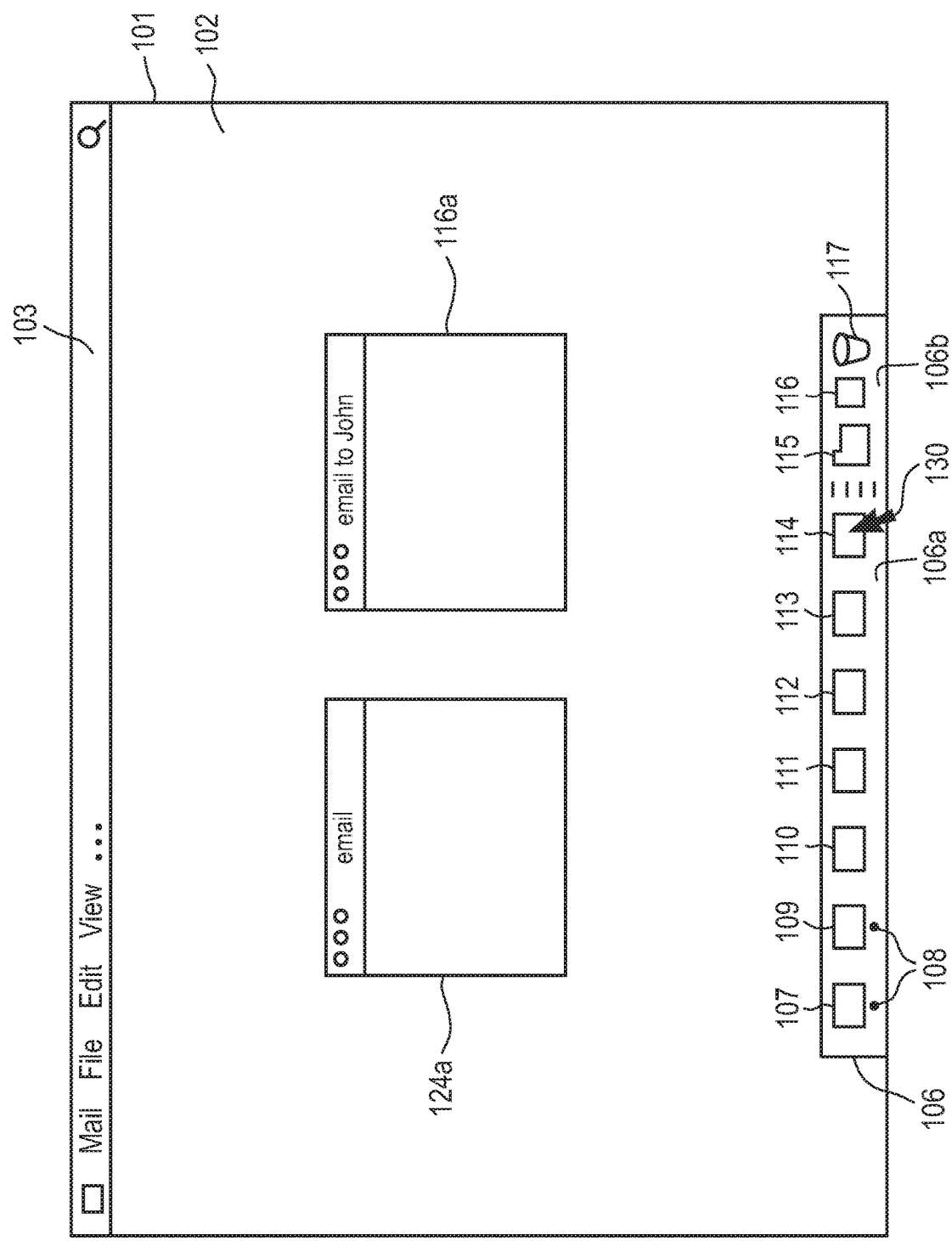
FIG. 1D shows an embodiment in which only windows of a particular selected application are displayed in the Exposé mode while other windows are not displayed according to one embodiment of the present invention.

The embodiment shown in FIG. 1D provides a way for a user to enter Exposé mode for a particular application to show only windows for that particular application, even if the application has been hidden. This allows the user to enter Exposé mode without having to see all of the other windows on the system; often, some windows can be completely hidden under other windows. Moreover, this method allows the user to see those windows even if the particular application is not the frontmost application when entering Exposé mode. Furthermore, hidden windows can be viewed in Exposé mode without unhiding them upon exiting from Exposé mode if they are not selected within Exposé mode; if a user selects a hidden window from within Exposé mode then the application and its windows will be unhidden. The dock 106 can display icons for each running application in the dock portion 106A in one embodiment. In the example shown in FIG. 1D, a method for displaying only windows of a particular application can begin with the user interface shown in FIG. 1A. In this user interface, there are five displayed windows and one minimized window. In one embodiment, the system can allow a user to reorder minimized windows within Exposé mode. The displayed windows include an email window 124 and a minimized email window 116 controlled by the mail application which is represented by the mail icon 114 shown in the dock portion 106A. The user can, from the user interface shown in FIG. 1A in which the windows are overlapping, cause the system to display in Exposé mode only the windows of an application which is not providing the frontmost window. In this case, the mail program which controls the email window 124 and the minimized window 116 is not the frontmost application; rather, the Preview application is the frontmost application. The user can position the cursor 130 over the mail icon 114 and signal to the system that the user wants to enter Exposé mode to display only those windows controlled by the mail application. In one embodiment, the user can position the cursor 130 over the mail icon 114 and press a mouse button to select the icon 114 and can hold the mouse button down for a period of time indicating to the system that the user wants to enter Exposé mode for just the mail application represented by mail icon 114. In response, the system will display the user interface shown in FIG. 1D in which the mail window 124A and the minimized mail window 116A are shown in Exposé mode. It will be appreciated that entry into the Exposé mode to achieve the user interface shown in FIG. 1D may be performed by other user interaction, such as a touch or tap and hold on the icon 114 (by placing a finger or stylus over the icon and holding the placement of the finger) or by selecting a menu made available when the user positions the cursor over the icon 114 and presses one or more buttons, etc. Once the user has achieved the user interface shown in FIG. 1D, the user can select either of the email windows within Exposé mode to become the frontmost window and then exit Exposé mode. This selection can be made while viewing the full content of the window rather than merely a title of the window or some other abbreviated indicia of the window. In one embodiment, after exiting Exposé mode, the order of the windows shown in FIG. 1A may be maintained except for the email program whose windows now appear frontmost. Further details regarding the embodiment shown in FIG. 1D are provided in conjunction with the discussion of FIGS. 3A, 3B, 3C, and 3D. The embodiment of FIG. 1D enters Exposé mode through a selection of a specific application before Exposé mode begins, and this can be desirable because it avoids showing the user all of the opened (and optionally minimized) windows; however, it can be undesirable because it requires the user to know which application controls the desired window. Thus, in some cases a user would rather see all windows first in Exposé mode and then show, while remaining in Exposé mode, only those opened (and optionally minimized) windows of a specific application. Hence, in one embodiment, a user can enter Exposé mode (e.g. by pressing the F9 key or by some other user interface technique) and thereby cause the display of all opened windows of all executing applications (and optionally all of their minimized windows) and then cause Exposé mode to display the windows of only a selected application by, for example, interacting with the icon on the dock for that selected application. That interaction can be a user interface technique such as a "right click" on the icon or a set of key presses (e.g. the Command and Tab keys with a letter or number key, etc.). The interaction can include the use of a menu displayed adjacent to the icon as described herein.

Figure 2A:
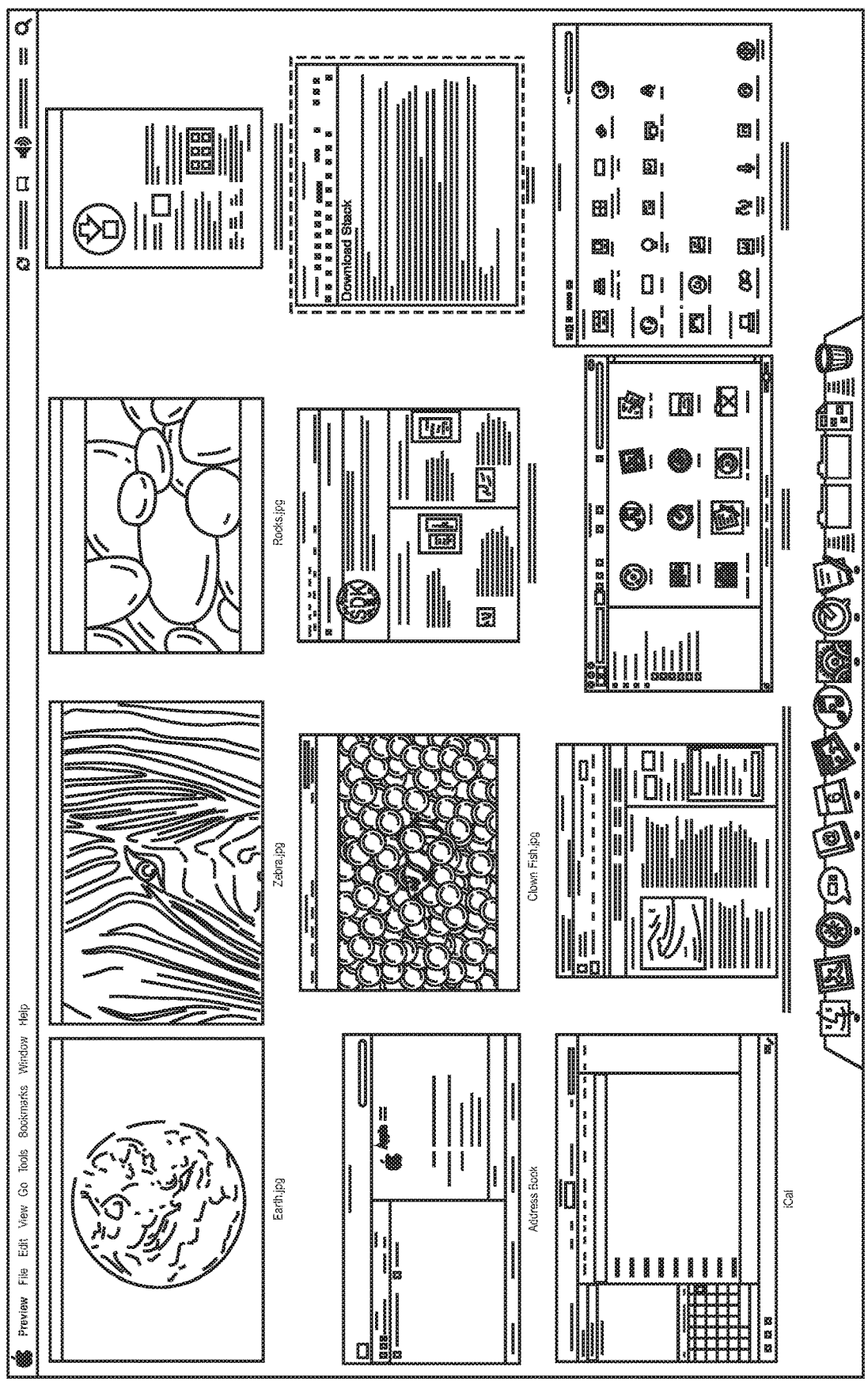
FIGS. 2A, 2B, and 2C show an example, through screen shots, of a user interface in which an improved or live preview of a particular selected window displayed in the Exposé array can be provided.
Figure 2B:
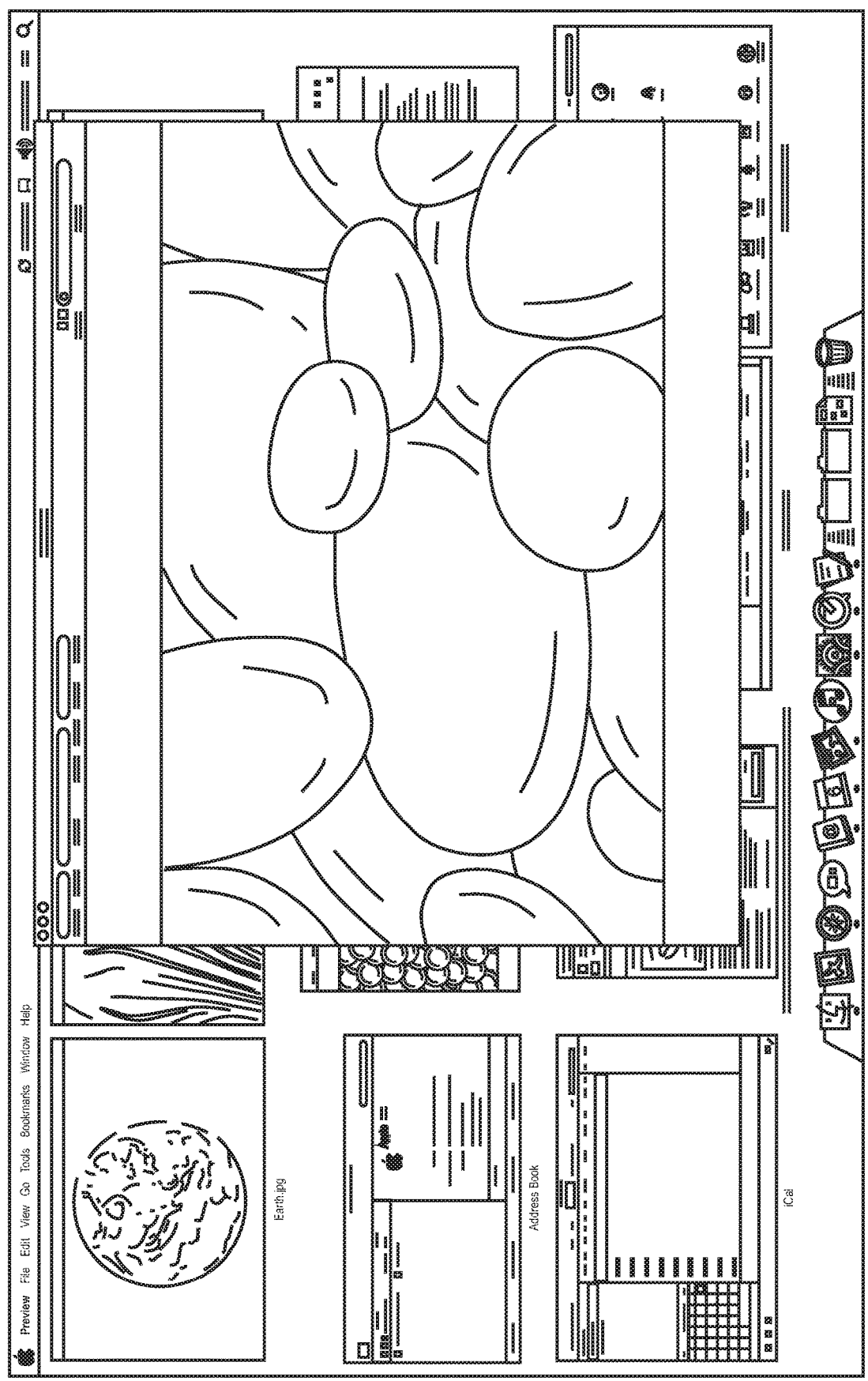
Figure 2C:
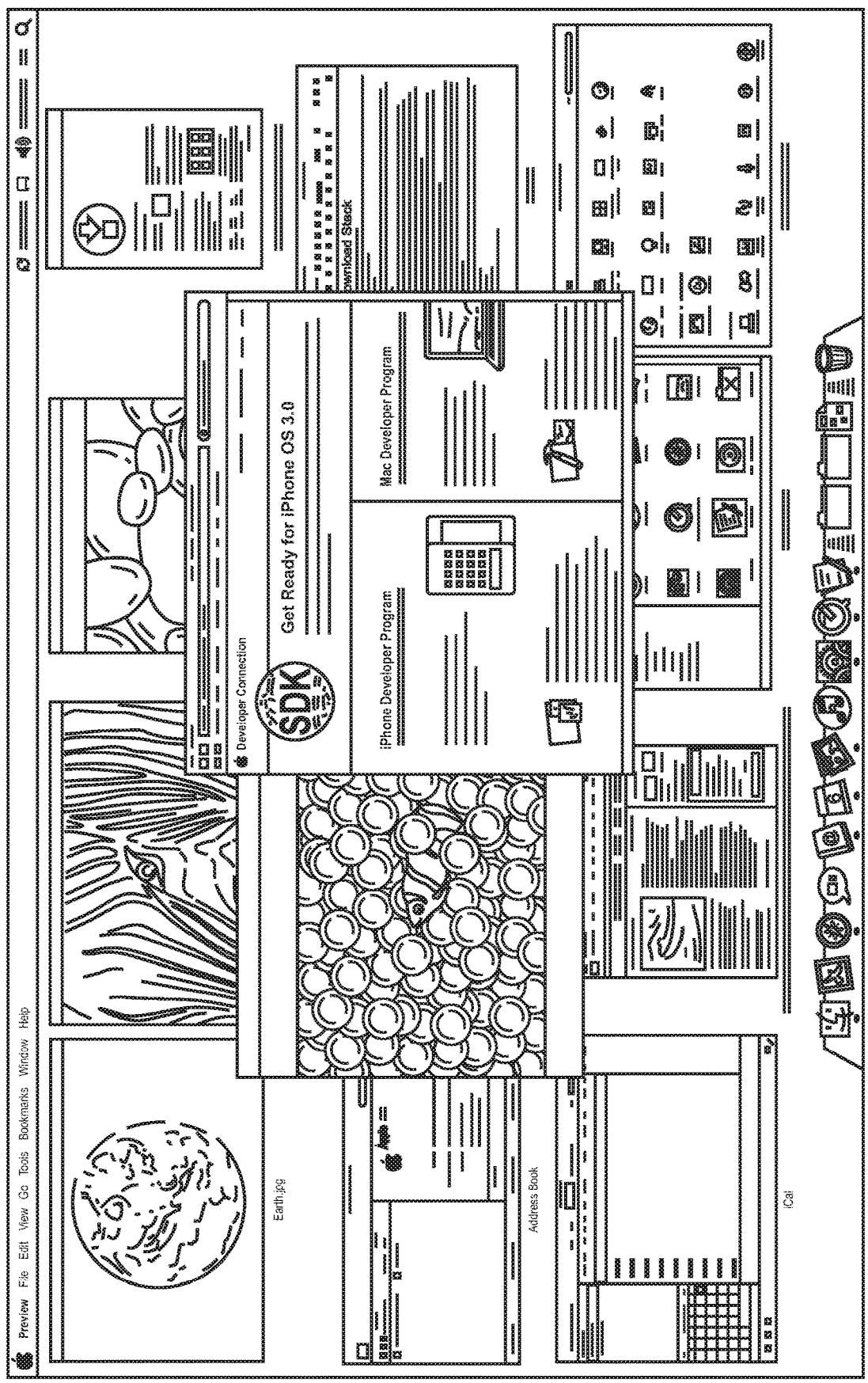

FIGS. 2A, 2B and 2C show an example of how a user can obtain an enlarged version of a window while in Exposé mode. As shown in FIG. 2A, the user has placed the system into Exposé mode in order to show all 12 windows either opened or minimized. Exposé mode may be entered into by pressing a key on a keyboard or by selecting a menu option; in one embodiment, the F9 key may be depressed to cause the system to enter Exposé mode and to display all 12 windows as shown in FIG. 2A. The windows in Exposé mode are shown in a tiled or non-overlapping array, and the full content of each window is shown within each window while in Exposé mode. In an alternative embodiment, a partial or alternative view within each window in Exposé mode could be provided. The user can then position the cursor over one of the windows or use the arrow keys on the keyboard to select a window in Exposé mode or, if a touch interface is available, touch one of the windows or otherwise select a particular window while in Exposé mode. In the example shown in FIG. 2A, the rightmost window in the middle row has been selected as indicated by the highlighting around that window. The user could press the up key once and the left arrow key once to arrive at the picture of the stones. Once selected, the user could activate a mode to see an enlarged version of the picture of the stones while still in Exposé mode. The enlarged version can expand from the center of its currently reduced size version to avoid obscuring other windows and the dock. In one embodiment, the user may depress and release the space bar key, after that picture is selected, to activate the enlarged view mode for the window showing the picture of stones. The resulting user interface is shown in FIG. 2B. This method allows the user to get a better view of a particular window in Exposé mode without leaving Exposé mode. It can be seen from FIG. 2B that the enlarged view of the window (which shows the picture of the stones) does overlap and hence cover the remaining windows (all windows other than the enlarged view) displayed in Exposé mode, but the remaining windows themselves stay in a non-overlapping state; in other words, none of the remaining windows overlap any other of the remaining windows and hence the remaining windows continue to be displayed, relative to each other, in the non-overlapping state. The user can, in one embodiment, then hit the space bar again to cause the window to go back to its normal size in Exposé mode as shown in FIG. 2A, and the user can continue to browse through the windows in Exposé mode, changing the selection of the currently selected window in Exposé mode. FIG. 2C shows how the user can move a cursor or otherwise change the selection of the particular window to enlarge another window in Exposé mode while staying within Exposé mode. As shown in FIG. 2C, the picture of the two fish is receding and shrinking while the picture of a Web page in a Web browser window is being enlarged. This results from the user moving the cursor or selection from the picture of the fish to the Web browser window. The preview displayed in the enlarged window, such as the enlarged window of the Web page shown in FIG. 2C, may be a live preview as described herein.

Figure 3A:
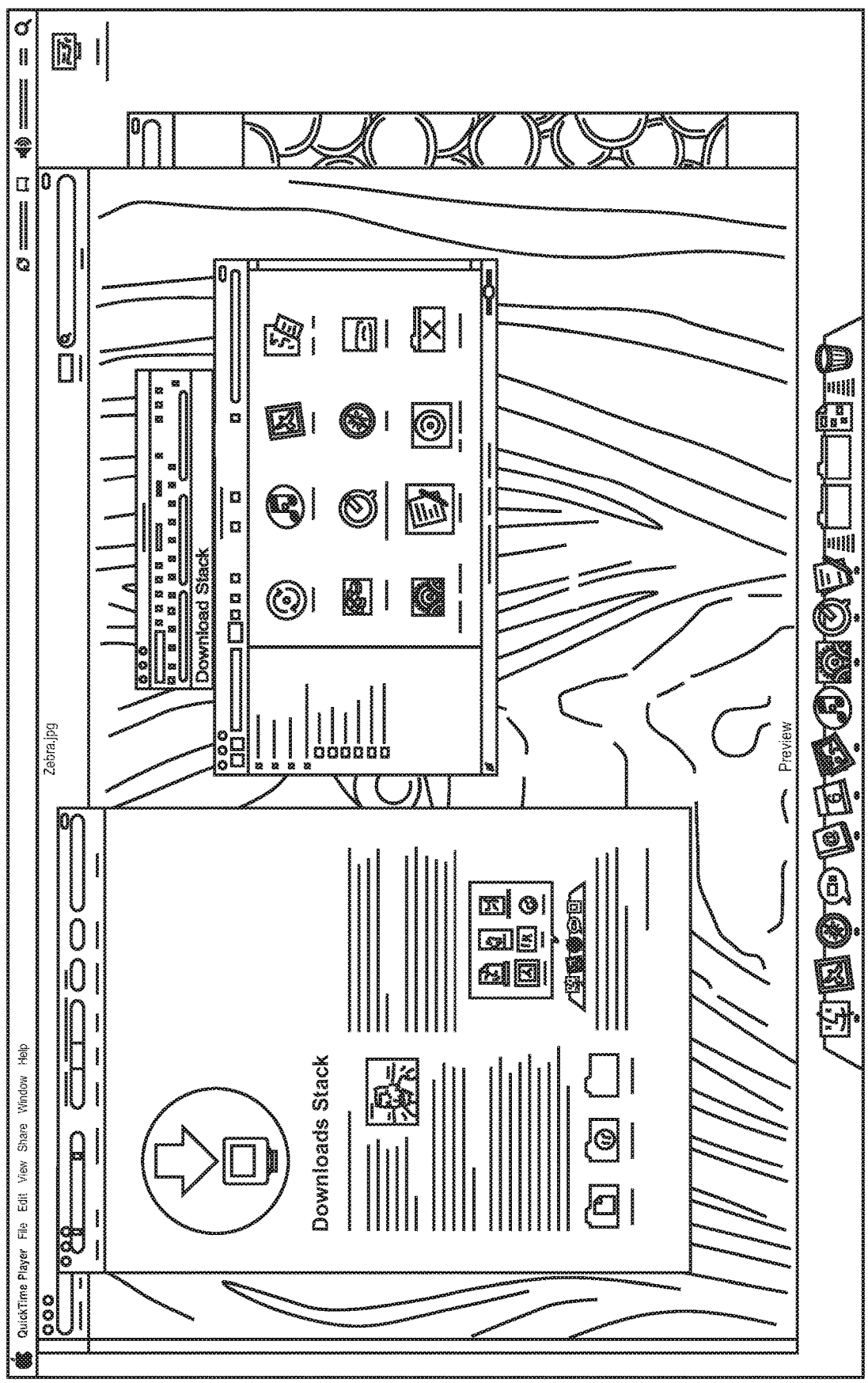
FIGS. 3A. 3B, 3C and 3D provide an example, through screen shots, of a user interface for allowing the user to interact with a control region of a display (e.g. a dock) in order to invoke Exposé and display windows of only a selected application in Exposé mode through the interaction with a control region, such as a dock.
Figure 3B:
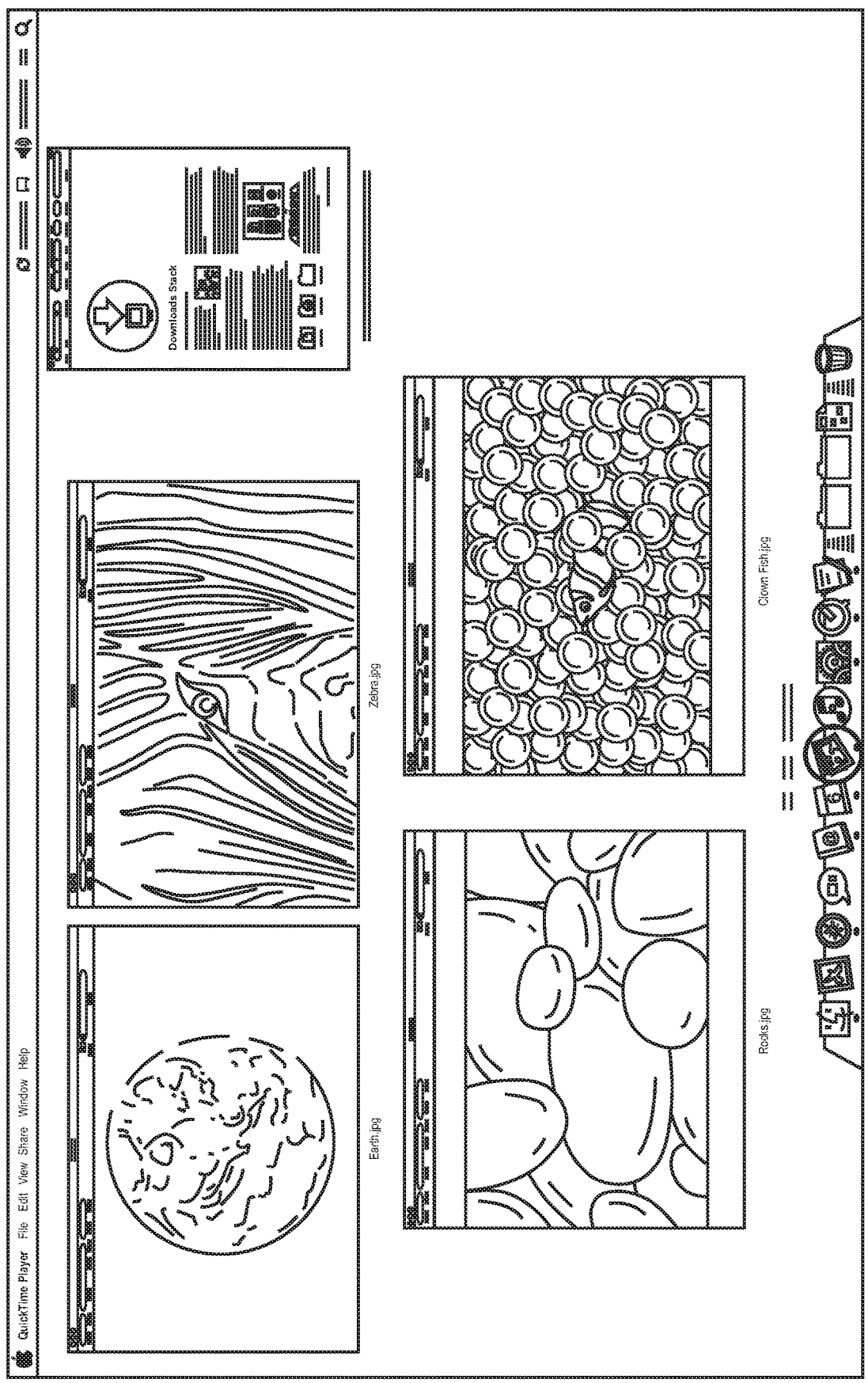
Figure 3C:
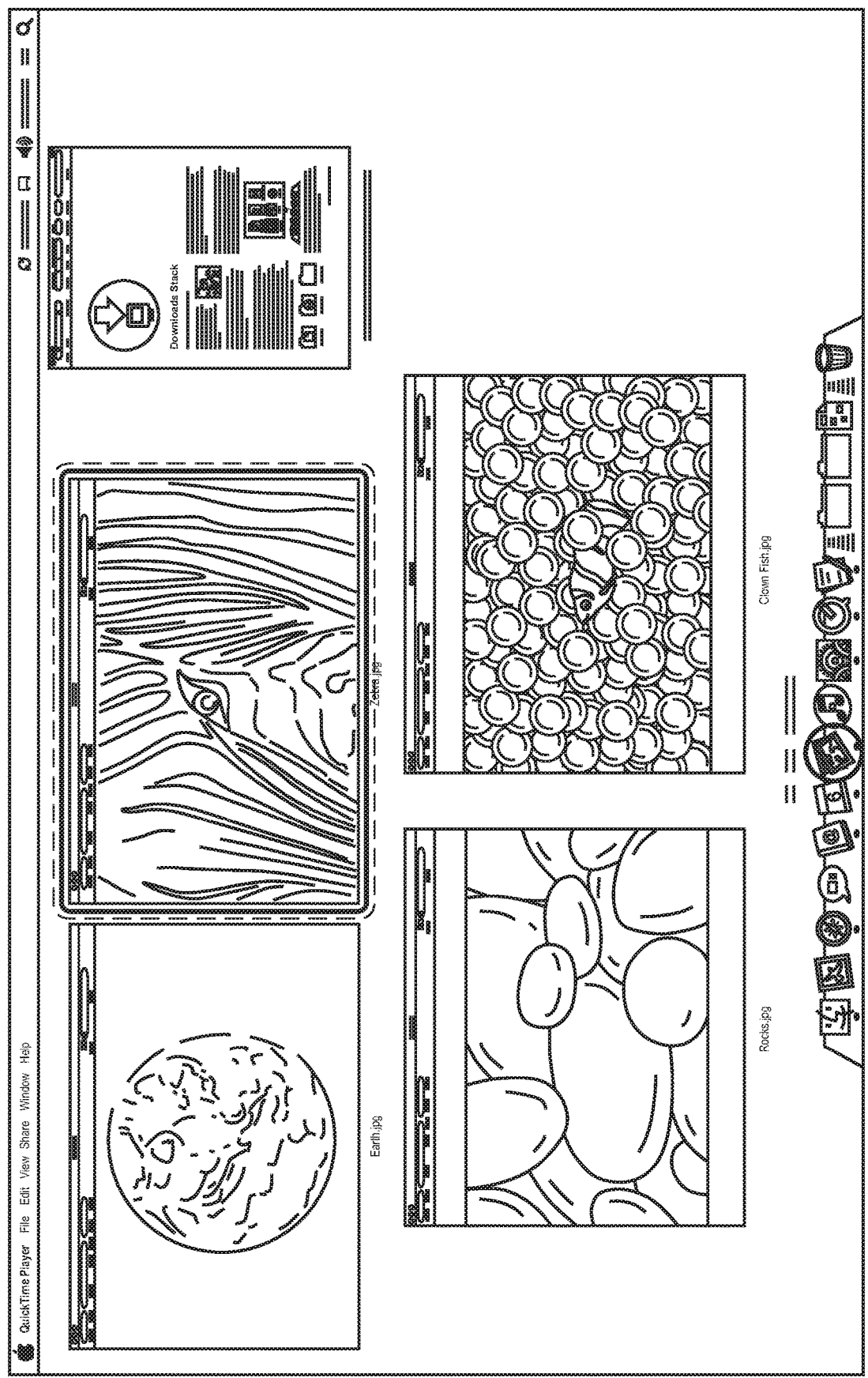
Figure 3D:
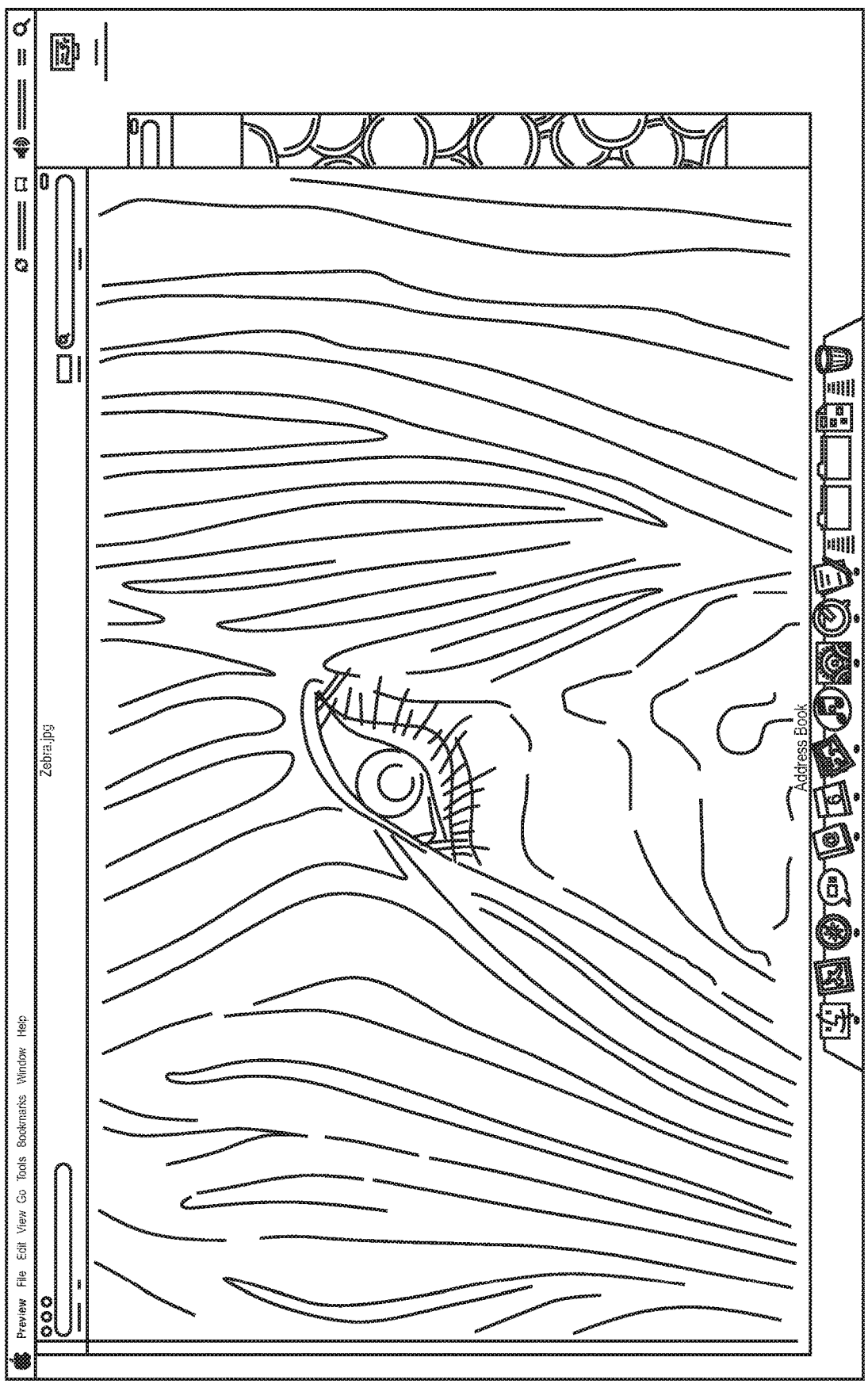
Figure 5:
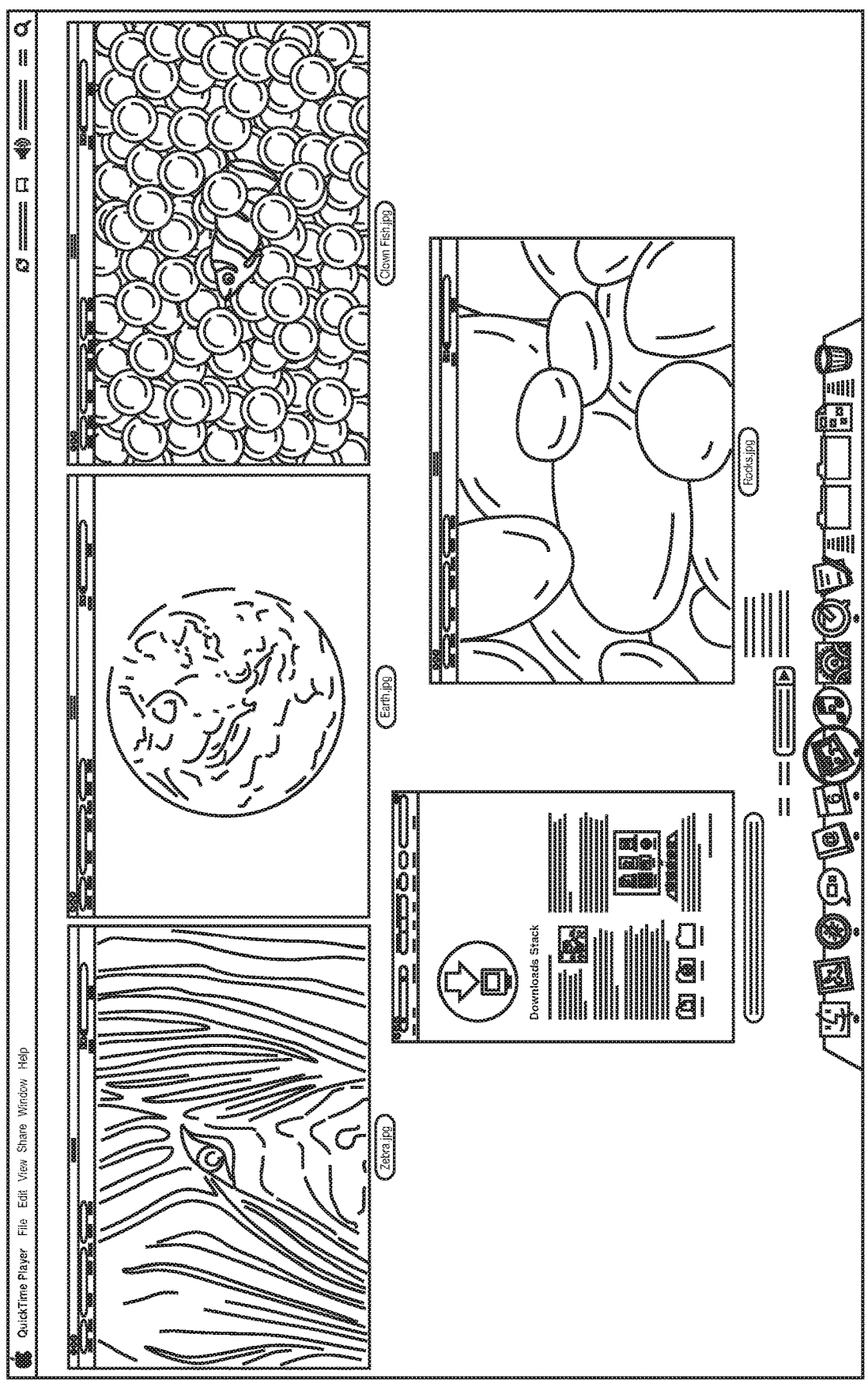
FIG. 5 shows an example of a menu available within Exposé mode for a particular application on the dock as shown in FIG. 5.

FIGS. 3A, 3B, 3C, and 3D illustrate an embodiment in which a user can interact with an icon on the dock for a particular program whose window or windows are not the topmost window and, through the interaction, cause the entry into Exposé mode to show only those windows for that selected application in a non-overlapping state in Exposé mode. In one embodiment, this can be achieved by positioning a cursor over the selected icon in the dock and depressing a mouse's button and holding the depressed button for a period of time to signal to the computer to enter Exposé mode to show only those windows in a non-overlapping state in Exposé mode for that selected application. Other user interface techniques could alternatively be used to enter Exposé mode for a specific application (thereby showing only windows of that specific application in a non-overlapping state), for example, a user can, in alternative embodiments, enter this Exposé mode by tapping (with a finger or a stylus) an icon in the dock and holding the tap (keeping the finger or stylus on the icon after the initial touch). For the discussion of FIGS. 3A-3D, it will be assumed that the user will use a mouse which controls a cursor. As shown in FIG. 3A, a user may position a cursor over the Preview icon (representing a program for displaying pictures and other content) in the dock in the bottom portion of the display. It can be seen that the Preview images or Preview windows are hidden behind other windows. For example, it can be seen that the picture of the fish and the picture of the zebra, both of which are in windows controlled by the Preview application, are behind other windows. The user can position the cursor over the preview icon in the dock, press down a mouse button and hold the mouse button down while positioning the cursor over the Preview icon in the dock. This will cause, as shown in FIG. 3B, the system to enter Exposé mode for that application showing all the windows of that application in a non-overlapping state (and showing the full content of those windows) and hiding the other windows of other applications. While continuing to hold the mouse button down, the user may then move the cursor over the different windows of the selected application to select one of the windows in the Exposé mode shown in FIG. 3B. This selection is shown in FIG. 3C in which the zebra picture has been selected as indicated by the highlighting around the window containing the zebra picture as shown in FIG. 3C. In certain embodiments, the user may select the window in Exposé mode by using the cursor keys on a keyboard, etc. It can also be seen that a menu appears above the selected icon in the dock. This menu may include the conventional menu items shown in association with selected icons on the dock, and may also include a listing of all the windows shown in Exposé mode for that application. FIG. 5 also shows an example of these menus which are associated with a particular selected icon on the dock. From the user interface shown in FIG. 3C, the user can indicate to the system that the zebra picture is to be displayed in full mode and that Exposé mode is to be exited, and thereby exiting Exposé mode, which is shown in FIG. 3D in which the Exposé mode has ended (as shown by the overlapping windows) and now the selected window appears frontmost (and other windows shown in FIG. 3A are now obscured behind the frontmost window).

Figure 4A:
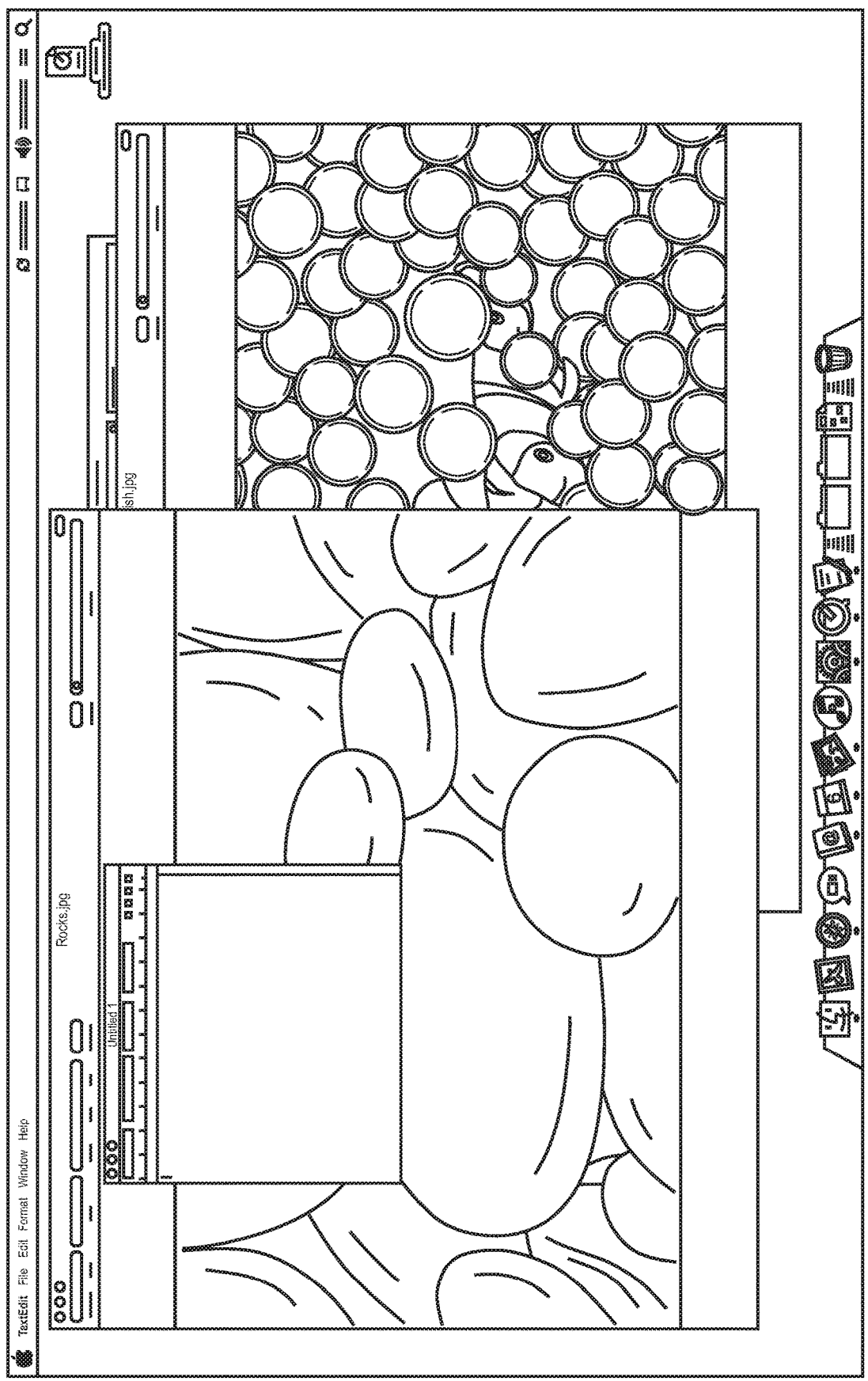
FIGS. 4A. 4B. 4C, and 4D show, through screen shots, an animation which can be provided according to certain embodiments when entering into and exiting Exposé mode. In this animation, the windows which are not shown appear to disappear into the center of the display when entering Exposé mode and when exiting Exposé mode they appear to enter from the center of the display.
Figure 4B:
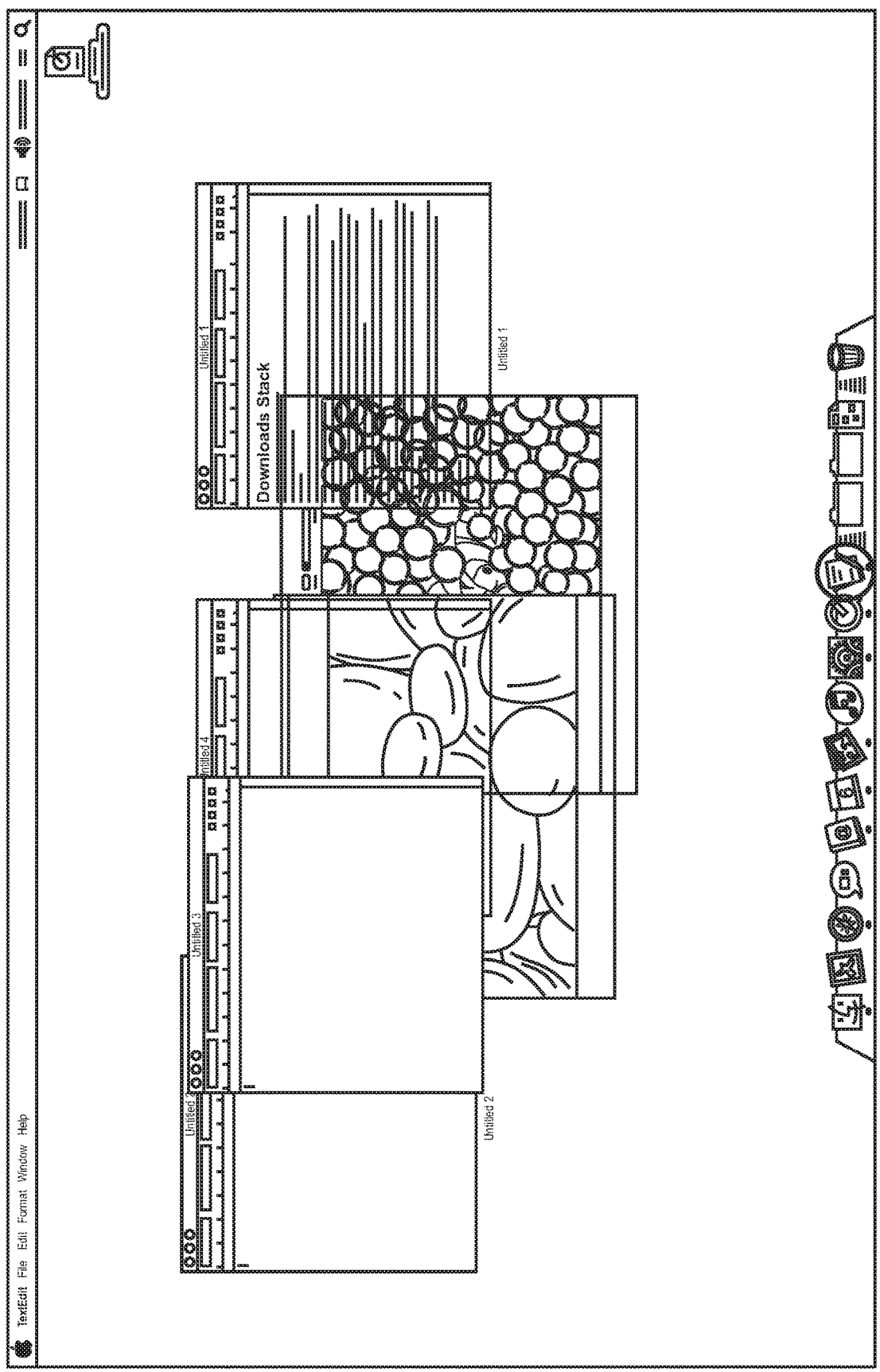
Figure 4C:
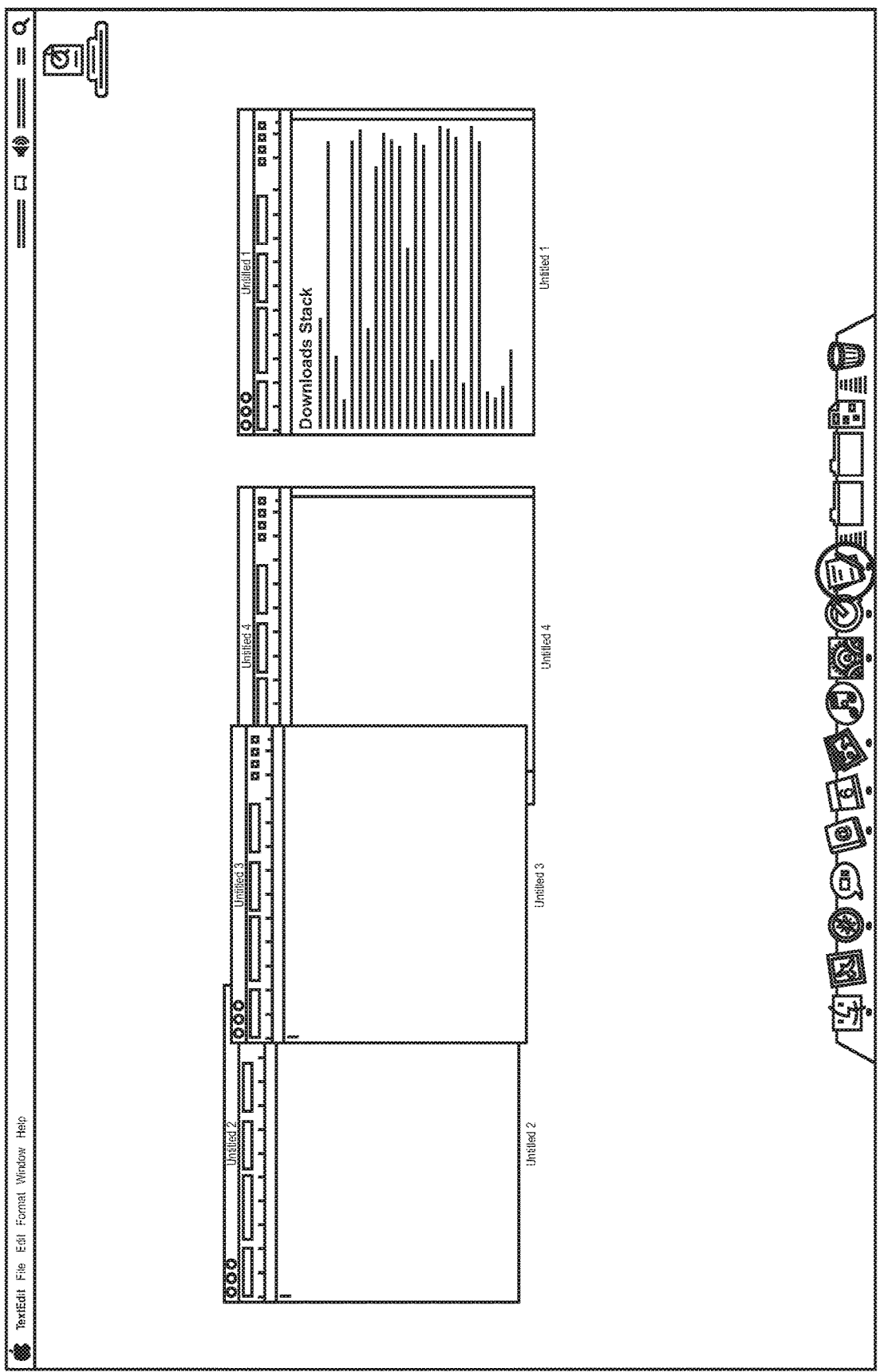
Figure 4D:
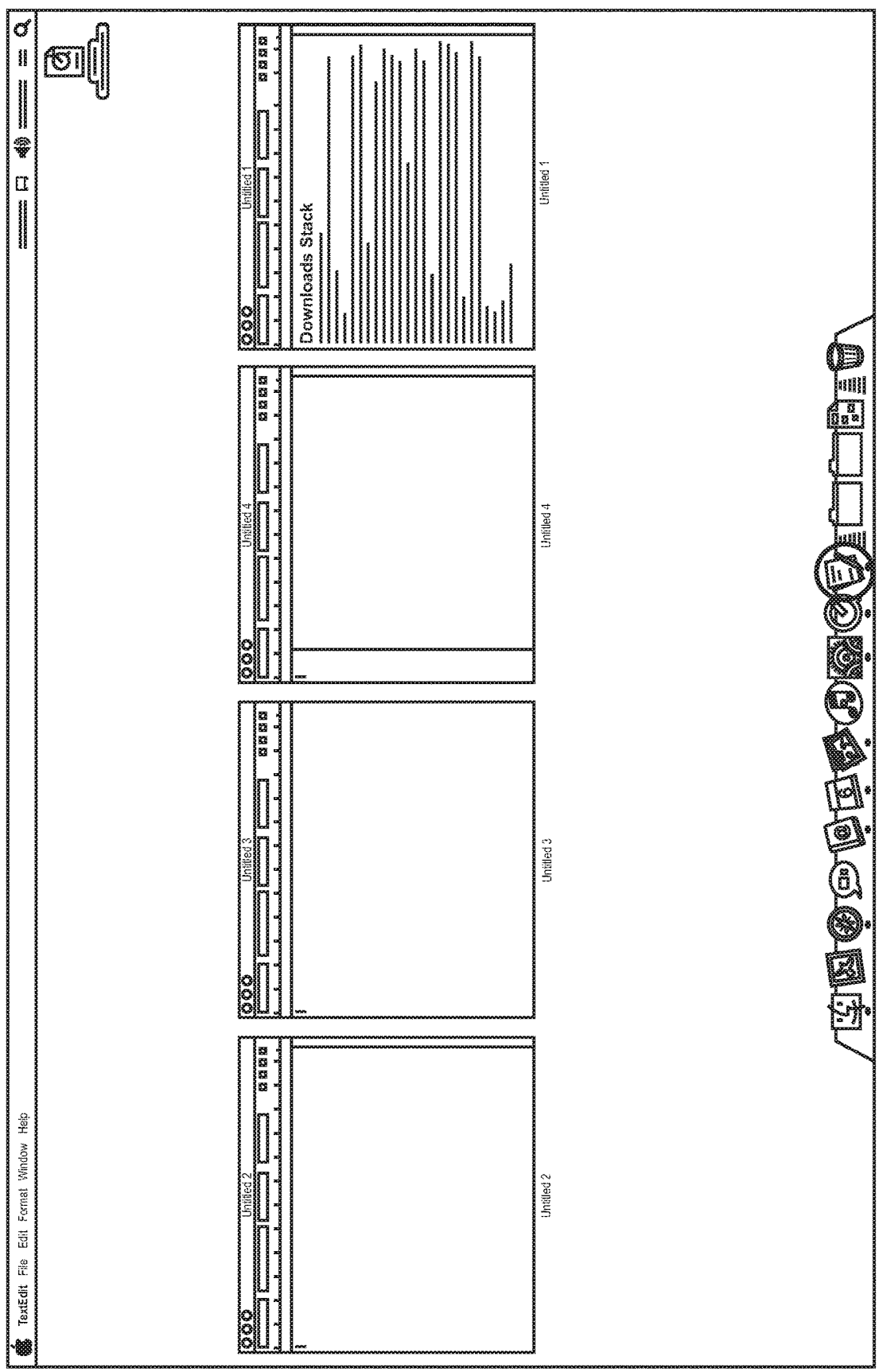

FIGS. 4A. 4B, 4C, and 4D illustrate an animation which can occur upon entry into or exit from Exposé mode. FIG. 4A shows the beginning of the animation before Exposé mode is entered. At this point, the windows are overlapping, and some windows are totally obscured and others are partially obscured. In this example, the user will enter Exposé mode by either selecting the "TextEdit" icon in the dock or by pressing a key on a keyboard, such as the F10 key, while "TextEdit" is the frontmost application. This signals to the system that the user wants to enter the Exposé mode showing only the windows of the TextEdit application. In this example, there are four such windows, one of which can be seen in FIG. 4A while the other windows of the TextEdit application remains obscured. Upon receiving the user's instructions to enter this Exposé mode, the system transitions to FIG. 4B in which the non-TextEdit windows appear to move in an animation from their current position to the center of the display; these windows also become more translucent through the animation as they move towards the center of the display as can be seen in FIG. 4C. At the same time, the windows of the TextEdit application are moved into a grid as can be seen in FIGS. 4B and 4C. At the end of the animation, the four windows of the TextEdit application, as shown in FIG. 4D, are spread out in a grid and the other windows are removed from the display. The animation can be performed in the reverse when exiting the Exposé mode shown in FIG. 4D, in which case the animation proceeds from FIG. 4D and moves towards FIG. 4A through FIG. 4C and then 4B and then 4A.

FIG. 5 shows an example of a user interface in which a menu associated with a particular selected icon in the dock appears. The menu can be seen above the Preview icon in the dock. This menu can be animated and change its appearance (and the selectable options or items available within the menu) depending upon the keys depressed by a user or other context indicated by the user or the system. In one embodiment, a modal nature of a system with Exposé allows any variety of other user interfaces both to control Exposé or windows or other features of the system. In one embodiment, the system can enter the Exposé mode shown in FIG. 5 by receiving a signal in which the cursor is positioned over the Preview icon in the dock and the user depresses the mouse's button or other key or signal indicator to cause the system to enter Exposé mode for the Preview application to show the windows of the Preview application. While the user continues to hold down the mouse button, the user can move the cursor and cause the menu to appear as shown in FIG. 5. The user can also move the cursor over any one of the images to select a particular image, thereby exiting Exposé mode. The selectable items or options displayed within a menu can depend upon the mode of the system. Before entering Exposé mode, the items for a particular icon can include one or more comments such as Quit, Force Quit, Exposé (for this Application only), Hide, Show in Finder, Remove from Dock, New Window, Open at Login, and a list of opened windows for the application represented by the particular icon and, optionally, application specific commands. After entering Exposé mode, in one embodiment the dock is still active and can still receive user commands, and some of the interaction with the dock (and its ability to receive commands) while in Exposé mode has been described herein. For example, while in Exposé mode, a user can select a particular icon for an application on the dock to show in Exposé mode only windows for that application or can select a particular window of the application (while in Exposé mode) to make that window frontmost while maintaining the order of the overlapping windows after exiting Exposé mode. While in Exposé mode, a user interaction with an application's icon on the dock can cause the display of a menu of selectable commands or items, including one or more commands or items such as: Quit, Force Quit, Hide, and a list of opened windows for the application represented by that application's icon and, optionally, application specific commands. The display of such a menu can occur by positioning a cursor, while in Exposé mode, over the application's icon in the dock and pressing a mouse's button (e.g. the right button) or by other user interface techniques. The user can, while in Exposé mode, also use the application's icon in the dock to switch to that application (if not already frontmost); for example, the user can select that application's icon in the dock (for example, by positioning the cursor over that icon and pressing a button such as the mouse's left button, and this can bring forward all windows of that application (in front of windows of all other applications)), and this may change the front to back order of the windows. In another embodiment, the user can use a set of key presses (e.g. the Command and the Tab and a number or letter keys) to select an application in order to bring all of that application's windows in front of the windows of all other applications.

Figure 6A:
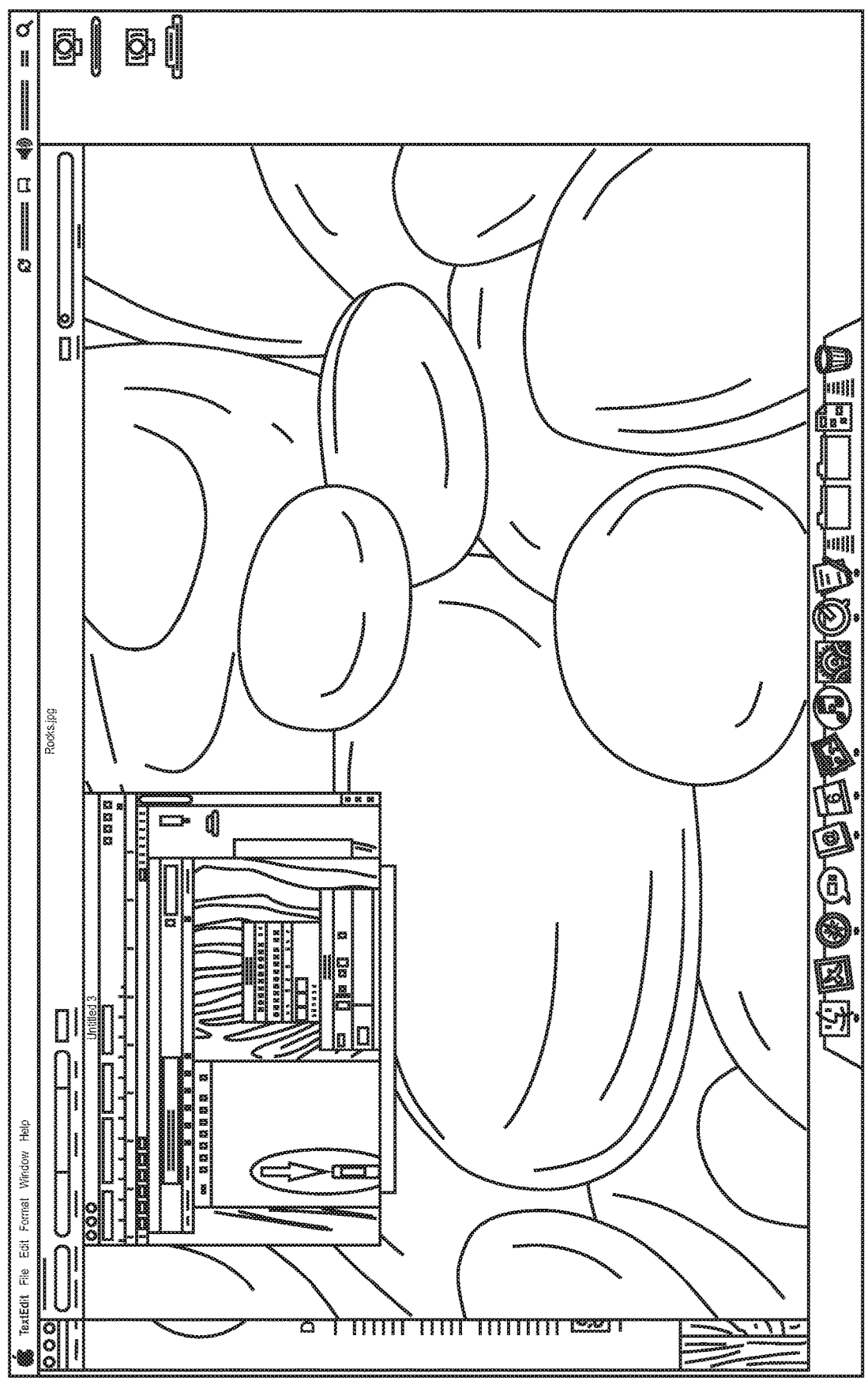
FIGS. 6A, 6B, 6C, 6D, and 6E show an example of a user interface which allows a user to drag and drop a file or other object (e.g. content within a file or document) onto an icon in the dock in order to invoke Exposé mode for that application's windows and to then continue the drag into any one of those windows, including minimized windows, for that application.
Figure 6B:
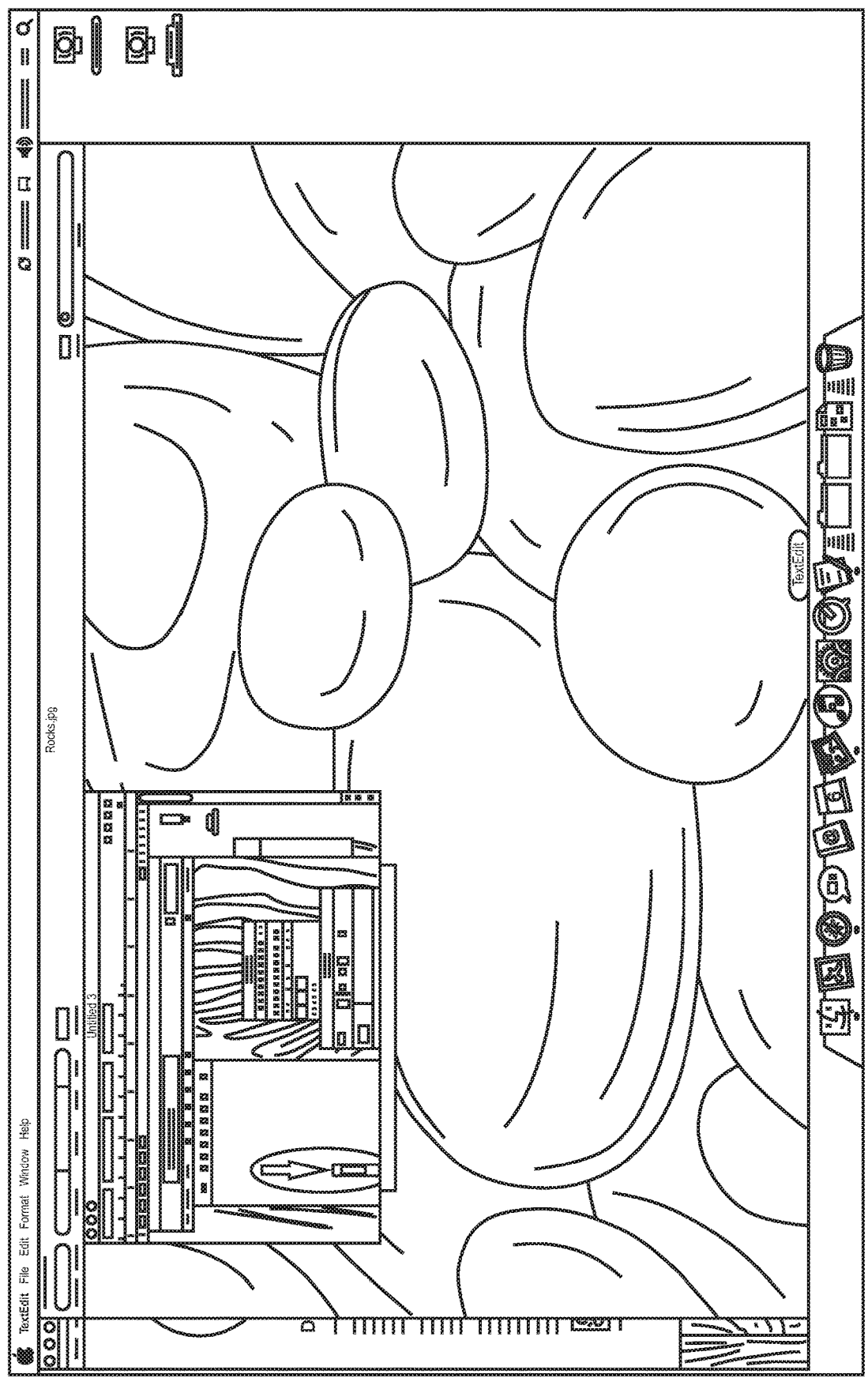
Figure 6C:
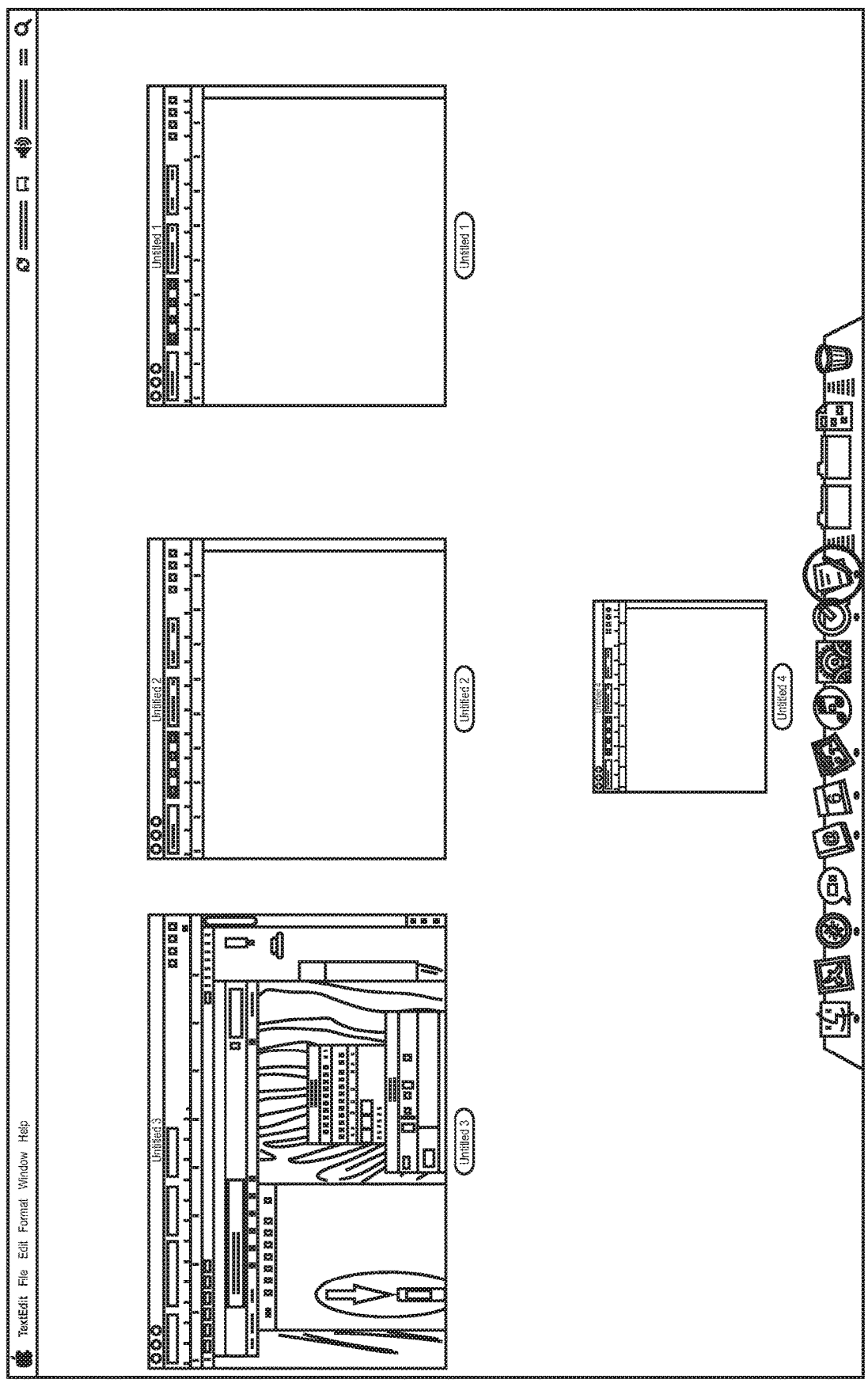
Figure 6D:
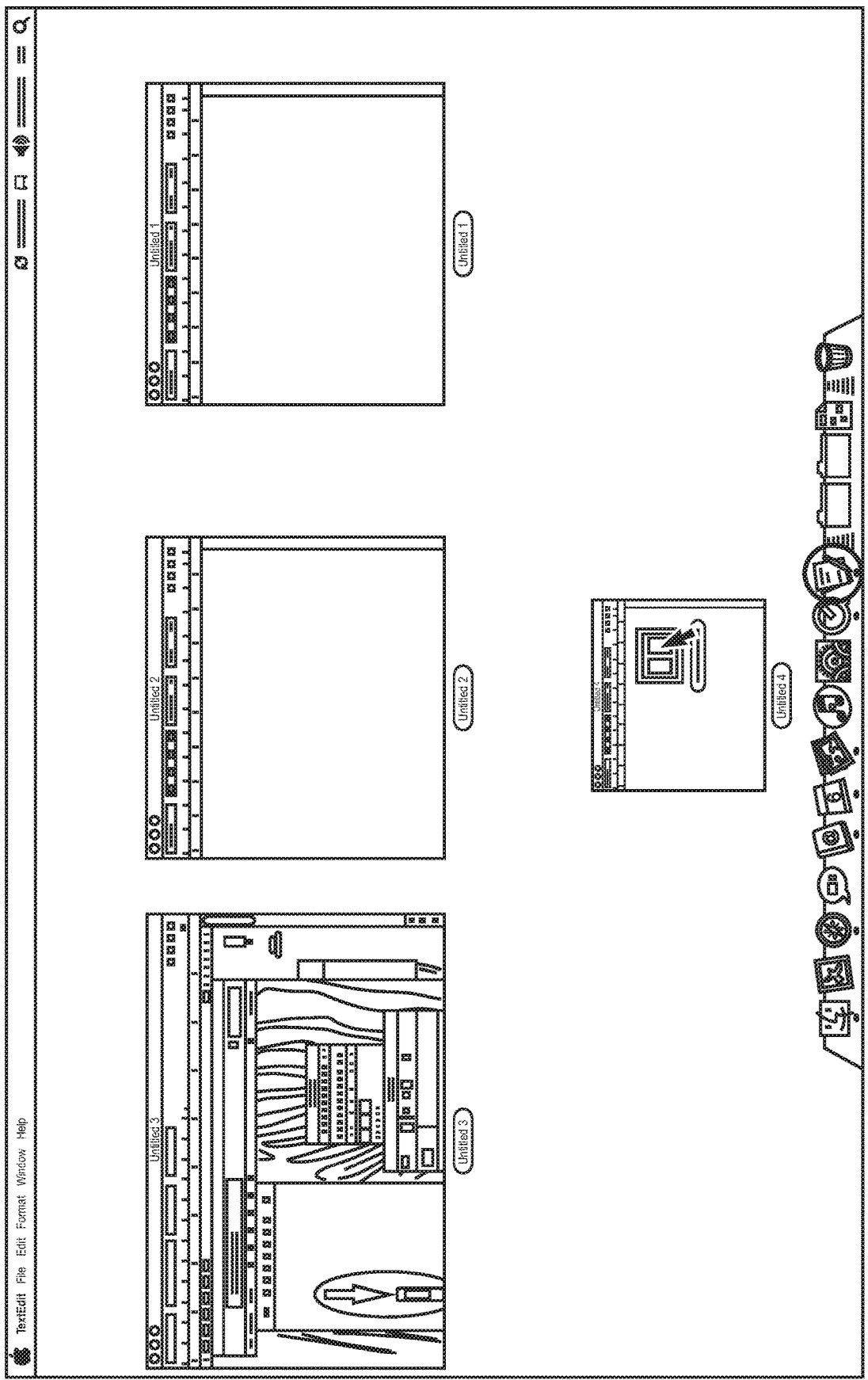
Figure 6E:
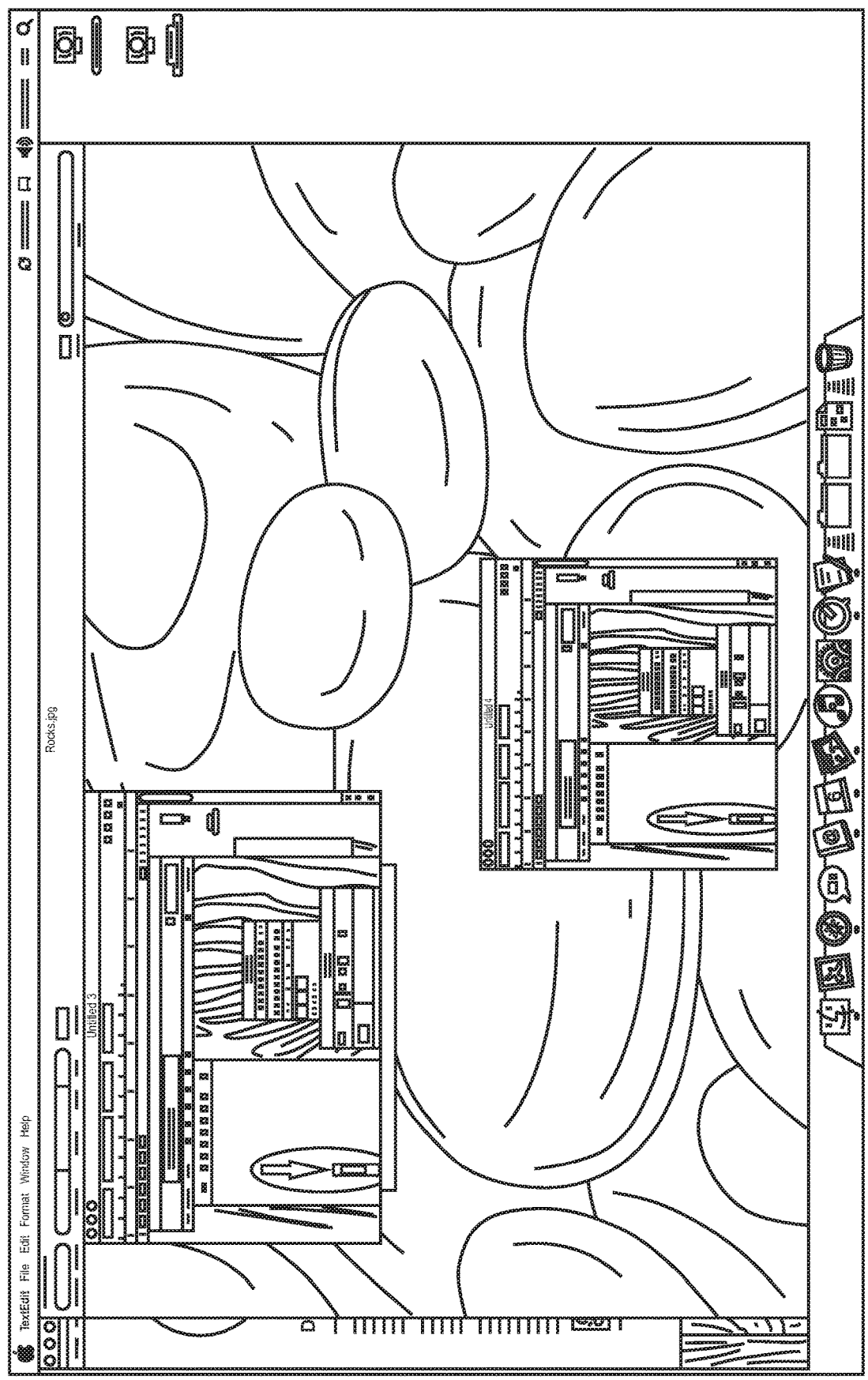

FIGS. 6A-6E show an example of a user interface which allows a user to drag an icon or other item onto an application's icon in the dock (or onto another region of a display such as a designated portion or "hot corner" which can launch Exposé mode) in order to enter Exposé mode and then allow the user to continue through the drag operation to drag the file or item into one of the windows shown in Exposé mode. It will be appreciated that in alternative embodiment, the drag operation may be replaced by a sequence of commands which indicates a selection of a file or item from the desktop or a Finder window, and then a selection of the icon on the dock for a previously launched application to receive the file which, in turn, invokes Exposé mode (either for only windows of the selected application or for all windows) and allows the user to then paste the item with another command into the window. Other user interface interaction techniques may be employed in yet further alternative embodiments. In the example provided in FIG. 6A, the user has selected the icon displayed on the desktop in the upper right hand corner of the display. The user, after selection, will continue to hold the mouse's button down (or use another user interface technique to hold the selection) while moving the icon ("dragging" of the icon) toward the TextEdit icon in the dock. The result of that move is shown in FIG. 6B in which the user has positioned an image of the icon dragged from the upper right hand corner over the TextEdit icon in the dock. After a period of time (while maintaining the selection of the icon), the system recognizes the user's input as a request to invoke Exposé mode to show only those windows, including minimized windows in one embodiment, for the TextEdit application. This Exposé mode for the TextEdit application is shown in FIG. 6C, in which it can be seen that the user is continuing to drag the file and will soon position the file, as shown in FIG. 6D, into the minimized TextEdit window shown just above the dock in FIG. 6D. The user can then select the target window by hovering over that window. At this point the user can exit Exposé mode (e.g. press the F9 key again), and this will cause the selected window to appear frontmost with the selected object (from the drag operation) being over the selected window after exiting from Exposé mode. Then the user can release the mouse's button or otherwise signal that the drag or move is completed, and this causes the system, in response to that signal, to show the selected window as the frontmost window in overlapping window mode as shown in FIG. 6E and to deposit the object into the selected window. It can be seen that the drag has been completed as indicated by the insertion of the contents of the file into the minimized TextEdit window which now appears just above the dock and on top of the picture of stones as shown in FIG. 6E. This process of dragging an object (e.g. a file or selected content of a file or document) to an application's icon on the dock and then invoking Exposé mode (to display all windows of that application) and then dropping the object onto a particular window gives the user the ability to move the object to a completely obscured window and to bring that window into the frontmost window state in one interaction; this process further gives the ability, through the display of the full content of each of the windows in a non-overlapping state in Exposé mode, to see and select the proper window (based on its content) in Exposé mode. In an alternative embodiment, the user's release of the mouse's button can both be a signal to end Exposé mode (causing the overlapping windows to appear with the selected window being the frontmost window) and to drop the object into the selected window. In one embodiment, the system can provide feedback, within Exposé mode, to the user to indicate whether the selected window can accept the object being dragged by the user to the selected window. For example, as the user hovers the dragged object over a window, a "+" icon could indicate that the object can be deposited into the window (and a "−" or "No" icon could indicate that it cannot be deposited).

Figure 7:
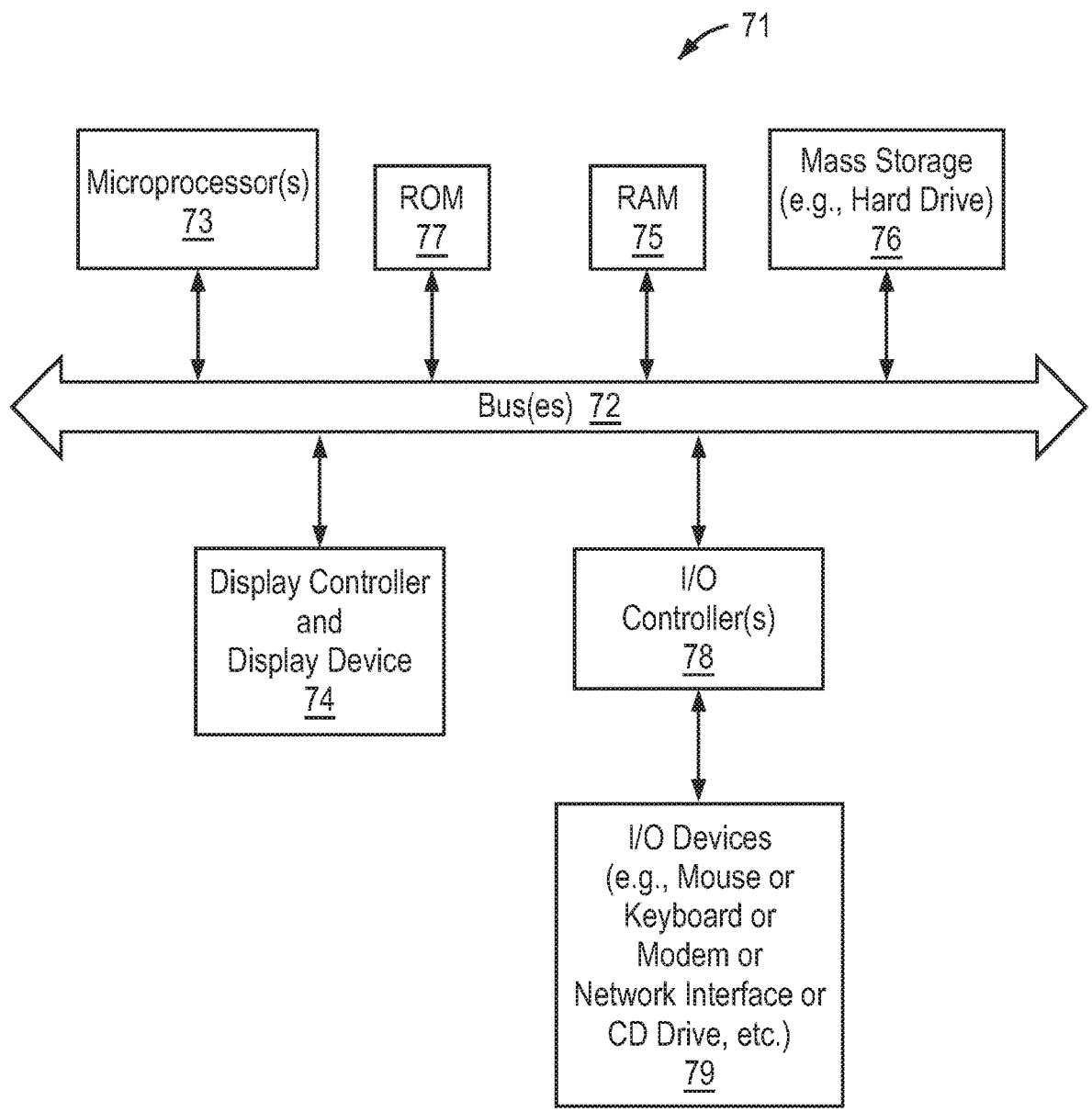
FIG. 7 shows an example of a data processing system which may be used to implement any one of the embodiments described herein.

FIG. 7 shows one example of a typical computer system which may be used with the present invention. Note that while FIG. 7 illustrates various components of a computer system, it is not intended to represent any particular architecture or manner of interconnecting the components as such details are not germane to the present invention. It will also be appreciated that network computers, handheld computers, cellular telephones, entertainment systems, other data processing systems or consumer electronic devices which have fewer components or perhaps more components may also be used with the present invention or may implement one or more embodiments described herein. The computer system of FIG. 7 may, for example, be a Macintosh computer from Apple Inc.

As shown in FIG. 7, the computer system 71, which is a form of a data processing system, includes a bus 72 which is coupled to a microprocessor(s) 73 and a ROM (Read Only Memory) 77 and volatile RAM 75 and a non-volatile memory 76. The microprocessor 73 may be one or more microprocessors from Intel. The bus 72 interconnects these various components together and also interconnects these components 73, 77, 75, and 76 to a display controller and display device 74 and to peripheral devices such as input/output (I/O) devices which may be a touch input panel, mice, keyboards, modems, network interfaces, printers and other devices which are well known in the art. Typically, the input/output devices 79 are coupled to the system through input/output controllers 78. The volatile RAM (Random Access Memory) 75 is typically implemented as dynamic RAM (DRAM) which requires power continually in order to refresh or maintain the data in the memory. The mass storage 76 is typically a magnetic hard drive or a magnetic optical drive or an optical drive or a DVD RAM or other types of memory systems which maintain data (e.g. large amounts of data) even after power is removed from the system. Typically, the mass storage 76 will also be a random access memory although this is not required. While FIG. 7 shows that the mass storage 76 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 72 may include one or more buses connected to each other through various bridges, controllers and/or adapters as is well known in the art. In one embodiment the I/O controller 78 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 77, RAM 75, mass storage 76 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 73.

Figure 8A:
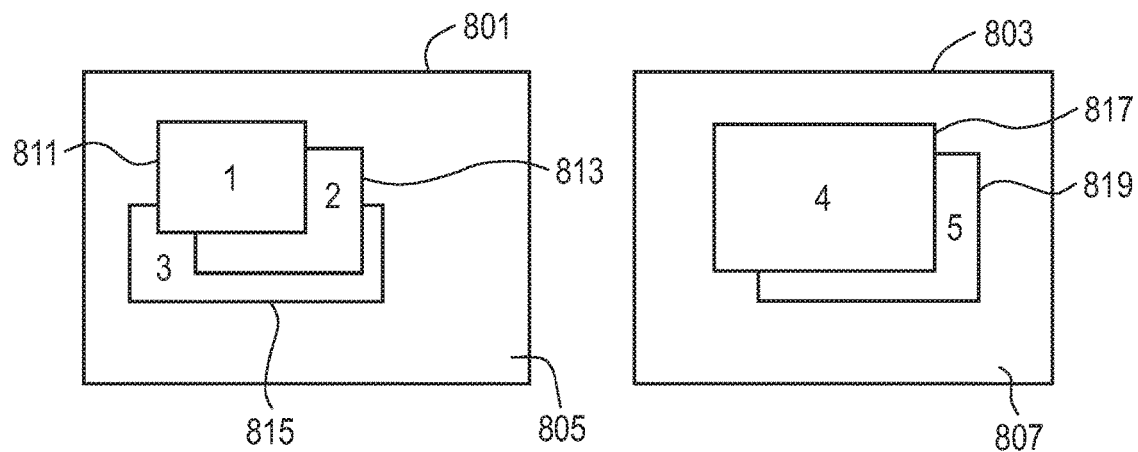
FIGS. 8A and 8B show an example of one embodiment in which Exposé mode is used across multiple displays which are coupled to a single system.
Figure 8B:
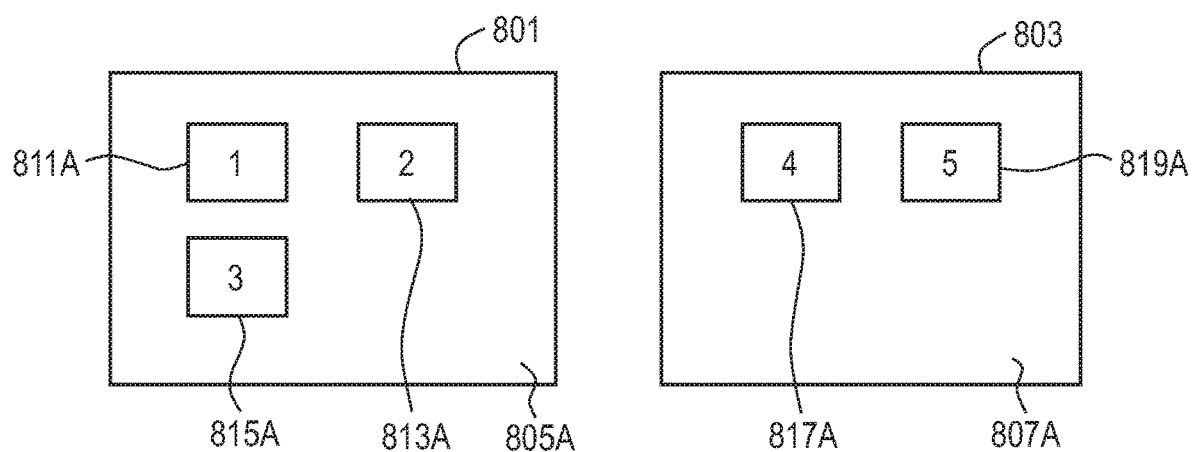

FIGS. 8A and 8B depict an embodiment in which Exposé mode can work with multiple displays driven by the same data processing system. For example, a desktop computer can have two or more display devices connected to it and driven by it. Users will often implement such a system in order to provide a greater display space which in turn means the user can often display more windows on the combined displays. In the case of the embodiment shown in FIG. 8A, two displays, display 801 and 803, show five windows. In particular, display device 801 shows windows 811, 813, and 815 while display device 803 shows windows 817 and 819. Each of the display devices 801 and 803 may be any one of a plurality of display devices, such as a liquid crystal display or a plasma display, etc. The windows shown in FIG. 8A are presented in an overlapping state or mode. When the user invokes Exposé mode in one embodiment, the system changes the displays to show the user interface shown in FIG. 8B in which the windows on each display are spread out in an array or gridlike fashion, which is also a non-overlapping state. In particular, as shown in FIG. 8B, the display 801 now shows the three windows spread out in an Exposé mode or non-overlapping window mode. Window 811*a* corresponds to window 811 and window 815*a* corresponds to window 815, and window 813*a* corresponds to window 813. Similarly, the display 803 in Exposé mode as shown in FIG. 8B spreads out the overlapping windows 817 and 819 to show windows 817*a* and 819*a* on the display device 803. A window is shown in Exposé mode on the same display device that it is shown in normal (non-Exposé) mode. While not shown in FIG. 8A or 8B, a window may bridge both display devices and thereby bridge both desktops 805 and 807 on the two displays. In this case, the bridging window will either be displayed in Exposé mode on both displays or on only one of the displays depending on the implementation. In another embodiment which uses multiple display devices, one display device can be designated as the main display device and the other display devices can be designated as secondary display devices, and in this case, all of the windows shown in Exposé mode can be presented on the main display device.

In certain embodiments, the implementations of Exposé mode described herein may be used in conjunction with Spaces from Apple Inc. of Cupertino, Calif., or in conjunction with other virtual multiple desktops on a single system for a single user. Spaces from Apple Inc. of Cupertino, Calif. is a software operating environment in which multiple desktops on a single system for a single user can allow a user to open up different applications in different desktops and maintain them on the same system for the same user, and allow the user to quickly switch between the different desktops. For example, a user may maintain one desktop for web browsing and emailing and another desktop for performing photographic image manipulation, and another desktop for performing programming or music creation. Each of these desktops may be considered separate and distinct, but are being used by the same user on the same system and the user can switch between these desktops, in effect switching between operating environments. Further information about Spaces is disclosed in published U.S. Application Publication US2008/0034317 which is incorporated herein by reference. In certain cases, the user may open windows of the same application in two different desktops or spaces, and it may be desirable in this case to allow Exposé to show all windows for a particular application in one Exposé view rather than separate and distinct Exposé views for each desktop or space. It will be recognized that the two different displays shown in FIG. 8A may also represent two different desktops or spaces each with two different sets of windows. In one embodiment, Exposé for the same user can display all of the windows across all of the desktops or spaces or can display all of the windows for a particular singular application (as in the case of the embodiment described in conjunction with FIGS. 3A-3D) across all of the desktops or spaces in one Exposé view. Moreover, the minimized windows may also be displayed in one Exposé view, including all minimized windows across all desktops or a selected group of the desktops.

One implementation of the embodiment shown in conjunction with FIG. 1C can allow a user to drag and drop windows between the two regions separated by the separator 132. In doing so, this can cause the system to change the minimization status of the particular window which is dragged between the two regions. For example, a user may select the window 116a, which is a minimized window, and drag this window into the non-minimized section by dragging the window above the separator 132; in turn, this will cause the system to change the minimization status of window 116a from a minimized window into a non-minimized window. The reverse operation can also occur in which a user drags a non-minimized window above the separator line 132 to the region below the separator line 132 to thereby change the status of the window to a minimized window.

In one implementation of a dock according to an embodiment of the present invention, windows are not minimized to a portion of the dock, such as the portion 106b but are rather minimized to the appropriate application icon on the dock, and the particular minimized window can be selected from a menu presented when the application's icon on the dock is selected, such as a right click of the mouse button, etc.

In one embodiment of Exposé, a user can add or remove sets of windows from Exposé mode. For example, in one embodiment, the user can select all Preview windows to be removed from the current Exposé mode or all TextEdit windows or both groups of Preview and TextEdit windows. After those windows are removed, the user can select to add them back for display in the current Exposé, mode. In one embodiment, these user selections can persist across invocations of Exposé mode.

It will also be appreciated that in one embodiment, the enlarged version or enhanced version of a particular window in Exposé mode, such as the enlarged version shown in the embodiment disclosed in conjunction with FIGS. 2A, 2B, and 2C, can also be used with selected application Exposé mode described in conjunction with FIGS. 3A-3D. In other words, while in the selected application Exposé mode, enlarged or enhanced views of a selected window can be displayed.

Figure 9A:
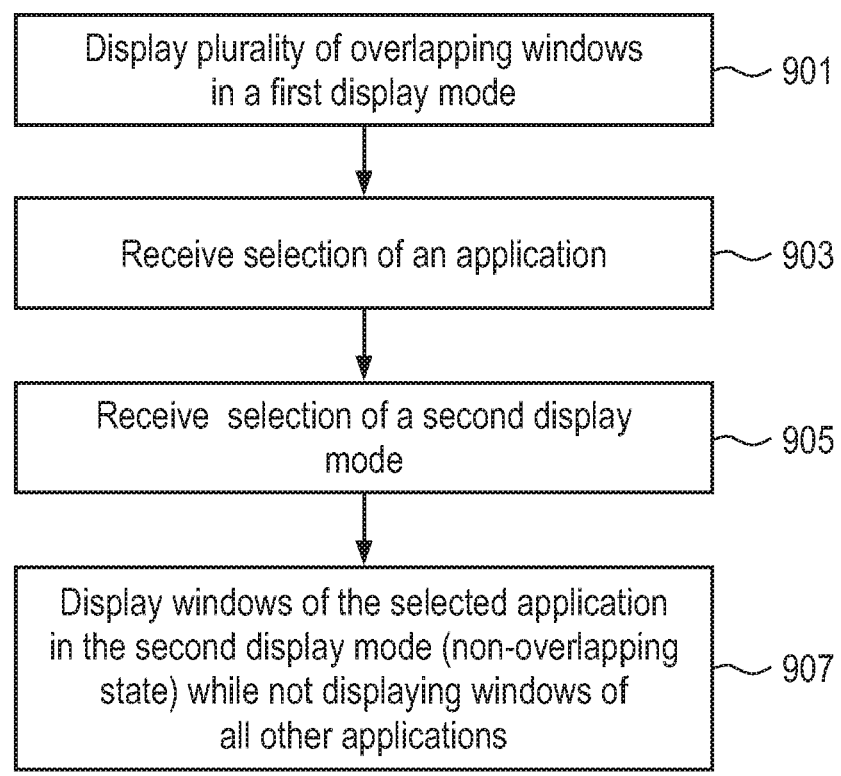
FIGS. 9A and 9B are flowcharts that show embodiments of methods in which Exposé mode is used to display only windows of a selected application.

FIG. 9A is a flowchart which depicts an example of a method according to one embodiment in which windows of a selected application are displayed in a non-overlapping state while windows of all other applications are not displayed in Exposé mode. In operation 901, a plurality of overlapping windows are displayed in a first display mode. In operation 903, the system receives a selection of an application from the user or from the system. In operation 905, the system receives a selection of a second display mode, which can be the Exposé mode. It will be appreciated that the order of operations 903 and 905 may be reversed, and the order of other operations described herein may also be reversed, at least in certain embodiments. In operation 907, the system displays windows of the selected application, which was selected in operation 903, in the second display mode in which the windows of the selected application are displayed in a non-overlapping state while windows of all other applications are not displayed in the second display mode. An example of the method of FIG. 9A is provided in conjunction with FIGS. 3A-3D. Moreover, the description of FIG. 1D provides another example of how windows of a selected application may be displayed in what may be referred to as an application-specific Exposé mode.

Figure 9B:
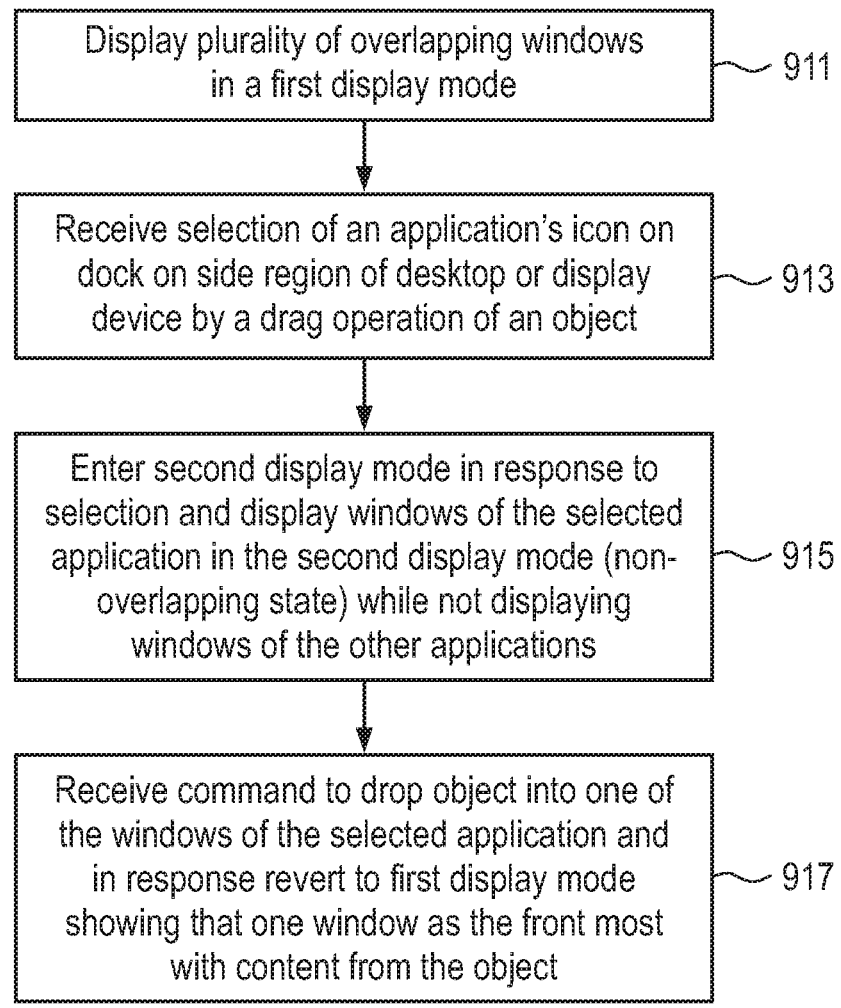

FIG. 9B shows an example of a method according to one embodiment in which Exposé mode can be launched or entered in response to the selection of an object which is associated with an icon of a particular application on, for example, the dock on a side region of the desktop or a display device. An example of this method is provided by FIGS. 6A-6D. In operation 911, a plurality of overlapping windows are displayed in a first display mode. In operation 913, the system receives a selection of an application's icon on the dock on a side region of the desktop or display device. This selection can occur by virtue of a drag operation of an object onto that icon. In operation 915, the system enters a second display mode in response to the selection in operation 913 and displays windows of the selected application in the second display mode, which is a non-overlapping state of windows while not displaying windows of other applications. The selected application is the application having the icon on the dock which received the drag operation in 913. The user can continue the drag from operation 915 while now being able to see all of the windows for the selected application. An example of this ability is shown in FIG. 6C wherein the user, before dropping the content or object which is being dragged, can determine which of the windows for the particular application selected is the desired target based upon the content of the windows which is fully viewable in Exposé mode. In operation 917, the system receives a command to drop the object into one of the windows of the selected application and in response, the system reverts to the first display mode (an overlapping windows display mode) and shows that one window which was the target of the drop as the frontmost window with the content of the object having been incorporated into the window. In this manner, the user can, in one continuous application, drag and drop an object into an obscured window from an overlapping window state and return to that overlapping window state with the target window now having achieved the status of the frontmost window and having incorporated content from the dragged object.

Figure 10:
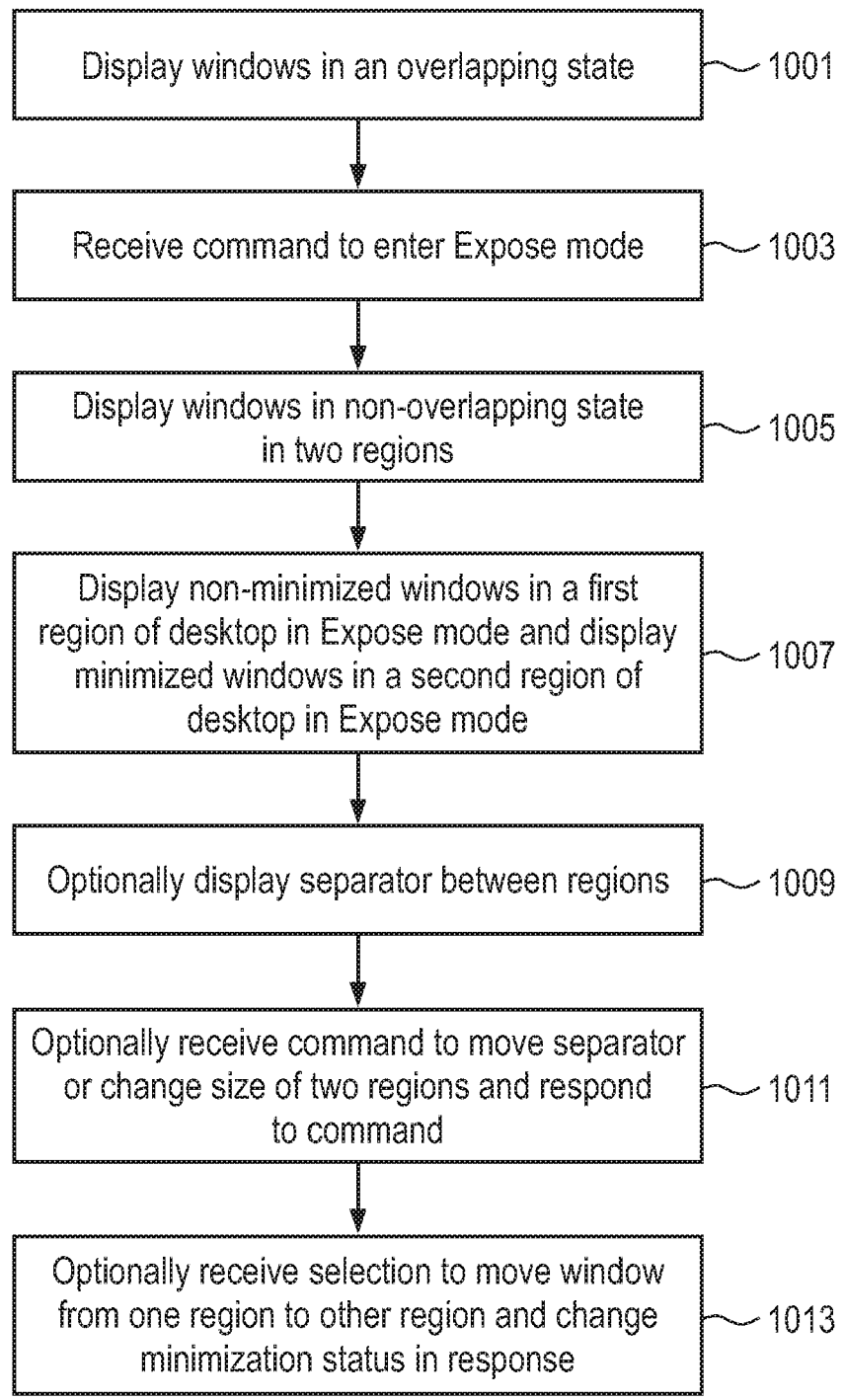
FIG. 10 is a flowchart that shows an embodiment of a method in which Exposé mode displays minimized windows.

FIG. 10 shows an example of a method in which minimized windows are displayed in Exposé mode along with non-minimized windows. In operation 1001, windows are displayed in an overlapping state. In operation 1003, the system receives a command to enter Exposé mode, and in operation 1005, the windows are displayed in a non-overlapping state in two regions. The first region shows non-minimized windows and the second region shows minimized windows, as illustrated in operation 1007. As shown in operation 1009, the system can optionally display a separator, such as the separator 132, between the two regions. Also, as shown in operation 1011, the system can optionally receive a command to move the separator or to otherwise change the size of the two regions and the system can respond to that command to move the separator or otherwise change the size of the two regions. As shown in operation 1013, the system can also optionally receive a selection to move a window from one region to another region and to thereby change the minimization status of the selected window in response to the move. It will be appreciated that the method shown in FIG. 1 may be used in conjunction with the user interface shown in FIG. 1C which has been described herein.

Figure 11:
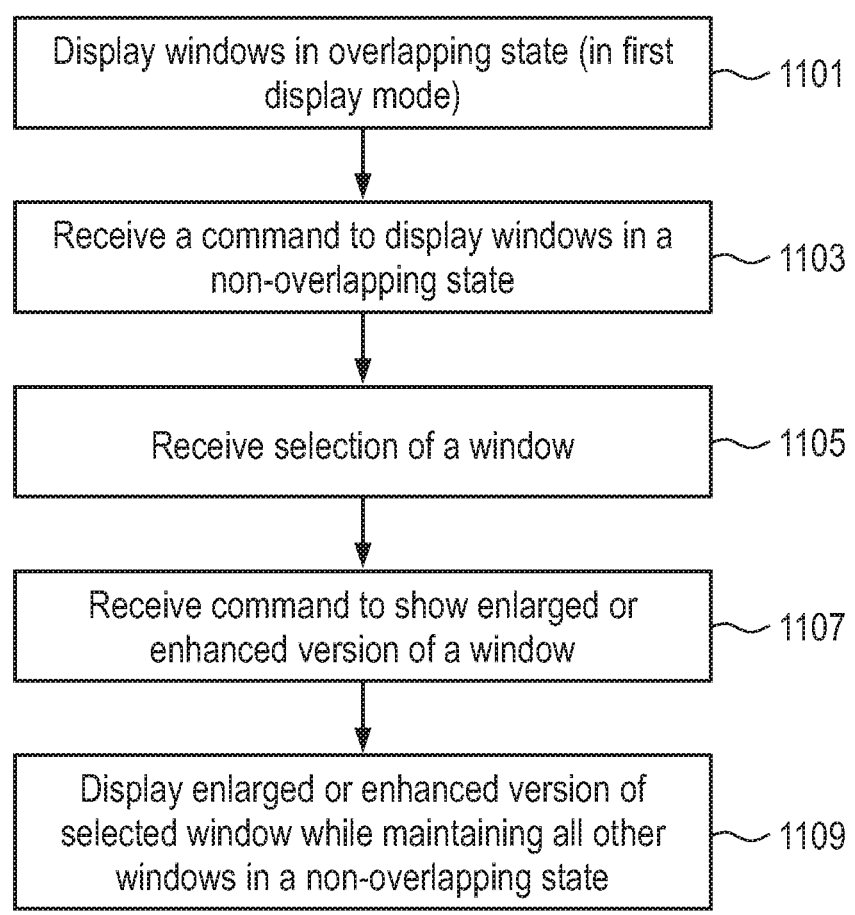
FIG. 11 is a flowchart that shows an embodiment of a method in which enlarged views of windows can be obtained while in Exposé mode.

FIG. 11 shows an example of a method according to one embodiment in which an enlarged or enhanced version of a particular window selected within Exposé mode can show enlarged or enhanced detail beyond what is available upon initially entering Exposé mode. In operation 1101, windows are displayed in an overlapping state. In operation 1103, a command is received to display windows in a non-overlapping state. In operation 1105, the system receives a selection of a window, and in operation 1107 the system receives a command to show an enlarged or enhanced version of a window. It will be appreciated that operations 1105 and 1107 may be performed in a different order than shown in FIG. 11; for example, their order may be reversed. In operation 1109, the system displays an enlarged or enhanced version of a selected window while maintaining all other windows in a non-overlapping state. An example of the method shown in FIG. 11 is shown and discussed in conjunction with FIGS. 2A, 2B, and 2C.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
   at an electronic device with a display and one or more input devices:
   displaying, on the display, a user interface in a first display mode configured to display a plurality of windows on a desktop, wherein at least one of the windows is displayed in overlapping relation with another of the windows;
   while displaying the user interface in the first display mode, detecting a first user input to enter a second display mode; and
   in response to detecting the first user input, transitioning from the first display mode to the second display mode, wherein, in the second display mode, representations of the plurality of windows are displayed on the desktop such that no representation is in overlapping relation with another representation;
   while displaying the user interface in the second display mode:
   detecting a second user input to cease display, in the first display mode, of a selected window of the plurality of windows; and
   detecting a third user input to return to the first display mode; and
   in response to detecting the third user input, transitioning from the second display mode to the first display mode, wherein, upon returning to the first display mode, the plurality of windows are displayed except for the selected window of the plurality of windows which is no longer displayed.

2. The method of claim 1, wherein, upon returning to the first display mode, the selected window is minimized.

3. The method of claim 1, wherein, in the second display mode, the representations of the plurality of windows are displayed in a first region of the desktop, wherein detecting the second user input includes detecting a drag-and-drop operation moving a representation of the selected window from the first region of the desktop to a second region of the desktop.

4. The method of claim 3, wherein the first region and the second region are separated by a displayed separator.

5. The method of claim 4, wherein the separator is movable to change a size of the first region and a size of the second region.

6. The method of claim 3, wherein, in the second display mode, the second region includes one or more representations of one or more minimized windows that are not displayed in the first display mode.

7. The method of claim 6, further comprising, while displaying the user interface in the second display mode, detecting a fourth user input to show, in the first display mode, a selected minimized window of the one or more minimized windows, wherein, upon returning to the first display mode, the plurality of windows includes the selected minimized window.

8. The method of claim 1, wherein, in the second display mode, representations of the plurality of windows are displayed concurrently with representations of one or more windows not displayed on the desktop in the first display mode.

9. The method of claim 8, wherein the representations of one or more windows not displayed on the desktop in the first display mode include representations of one or more minimized windows.

10. The method of claim 8, wherein the representations of one or more windows not displayed on the desktop in the first display mode include representations of one or more windows of another desktop.

11. An electronic device comprising:
   a display;
   one or more input devices; and
   one or more processors configured to:
   display, on the display, a user interface in a first display mode configured to display a plurality of windows on a desktop, wherein at least one of the windows is displayed in overlapping relation with another of the windows;
   while displaying the user interface in the first display mode, detect a first user input to enter a second display mode; and
   in response to detecting the first user input, transition from the first display mode to the second display mode, wherein, in the second display mode, representations of the plurality of windows are displayed on the desktop such that no representation is in overlapping relation with another representation;
   while displaying the user interface in the second display mode:
   detect a second user input to cease display, in the first display mode, of a selected window of the plurality of windows; and
   detect a third user input to return to the first display mode; and in response to detecting the third user input, transition from the second display mode to the first display mode, wherein, upon returning to the first display mode, the plurality of windows are displayed except for the selected window of the plurality of windows which is no longer displayed.

12. The electronic device of claim 11, wherein, upon returning to the first display mode, the selected window is minimized.

13. The electronic device of claim 11, wherein, in the second display mode, the representations of the plurality of windows are displayed in a first region of the desktop, wherein the one or more processors are configured to detect the second user input by detecting a drag-and-drop operation moving a representation of the selected window from the first region of the desktop to a second region of the desktop.

14. The electronic device of claim 13, wherein the first region and the second region are separated by a displayed separator.

15. The electronic device of claim 11, wherein, in the second display mode, representations of the plurality of windows are displayed concurrently with representations of one or more windows not displayed on the desktop in the first display mode.

16. A non-transitory computer-readable medium storing instructions which, when executed on an electronic device with a display and one or more input devices, causes the electronic device to perform operations comprising:

displaying, on the display, a user interface in a first display mode configured to display a plurality of windows on a desktop, wherein at least one of the windows is displayed in overlapping relation with another of the windows;

while displaying the user interface in the first display mode, detecting a first user input to enter a second display mode; and in response to detecting the first user input, transitioning from the first display mode to the second display mode, wherein, in the second display mode, representations of the plurality of windows are displayed on the desktop such that no representation is in overlapping relation with another representation;

while displaying the user interface in the second display mode:

detecting a second user input to cease display, in the first display mode, of a selected window of the plurality of windows; and detecting a third user input to return to the first display mode; and in response to detecting the third user input, transitioning from the second display mode to the first display mode, wherein, upon returning to the first display mode, the plurality of windows are displayed except for the selected window of the plurality of windows which is no longer displayed.

17. The non-transitory computer-readable medium of claim 16, wherein, upon returning to the first display mode, the selected window is minimized.

18. The non-transitory computer-readable medium of claim 16, wherein, in the second display mode, the representations of the plurality of windows are displayed in a first region of the desktop, wherein the one or more processors are configured to detect the second user input by detecting a drag-and-drop operation moving a representation of the selected window from the first region of the desktop to a second region of the desktop.

19. The non-transitory computer-readable medium of claim 18, wherein the first region and the second region are separated by a displayed separator.

20. The non-transitory computer-readable medium of claim 16, wherein, in the second display mode, representations of the plurality of windows are displayed concurrently with representations of one or more windows not presented on the desktop in the first display mode.

* * * * *